Figure 1:
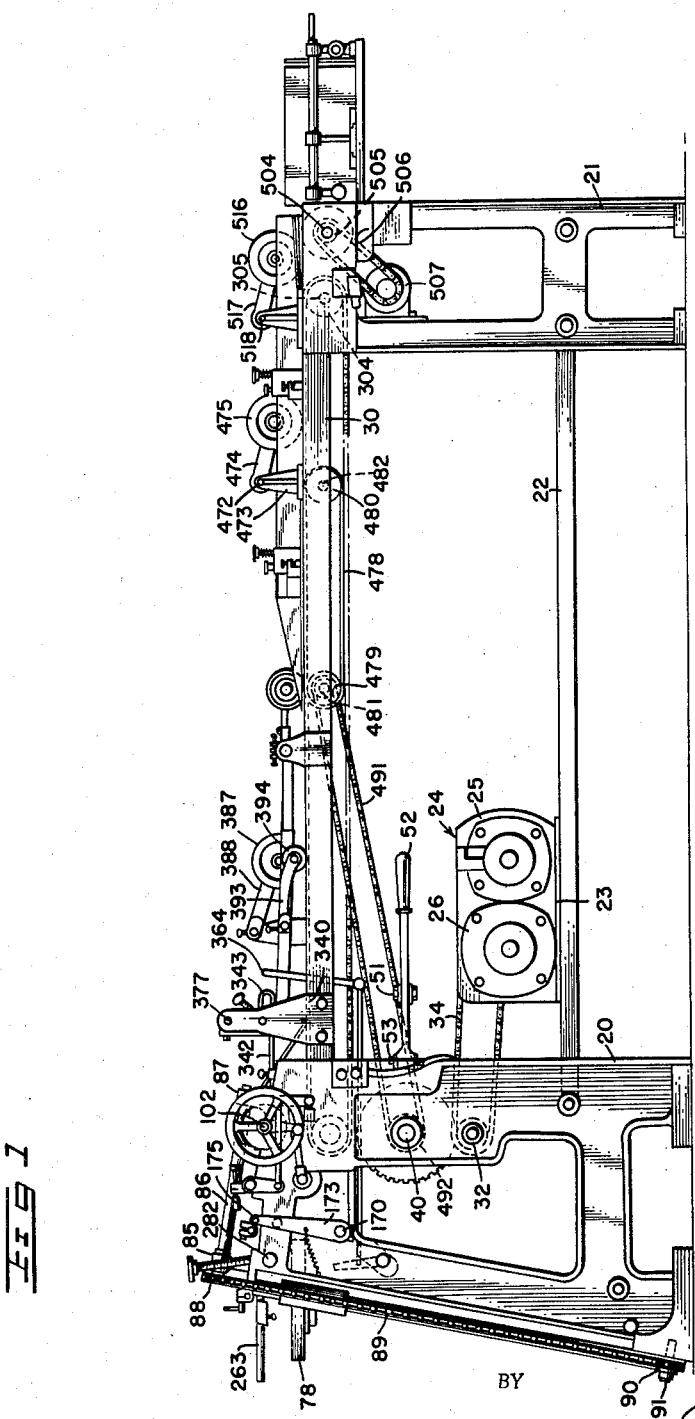

Sept. 15, 1959  A. W. McCLURE  2,903,830
BANDING MACHINE
Filed Nov. 24, 1954  19 Sheets—Sheet 1

INVENTOR
A. W. McCLURE
BY John F. Phillips
ATTORNEY

Sept. 15, 1959

A. W. McCLURE 2,903,830

BANDING MACHINE

Filed Nov. 24, 1954

19 Sheets-Sheet 2

INVENTOR
A. W. McCLURE

BY John F. Phillips

ATTORNEY

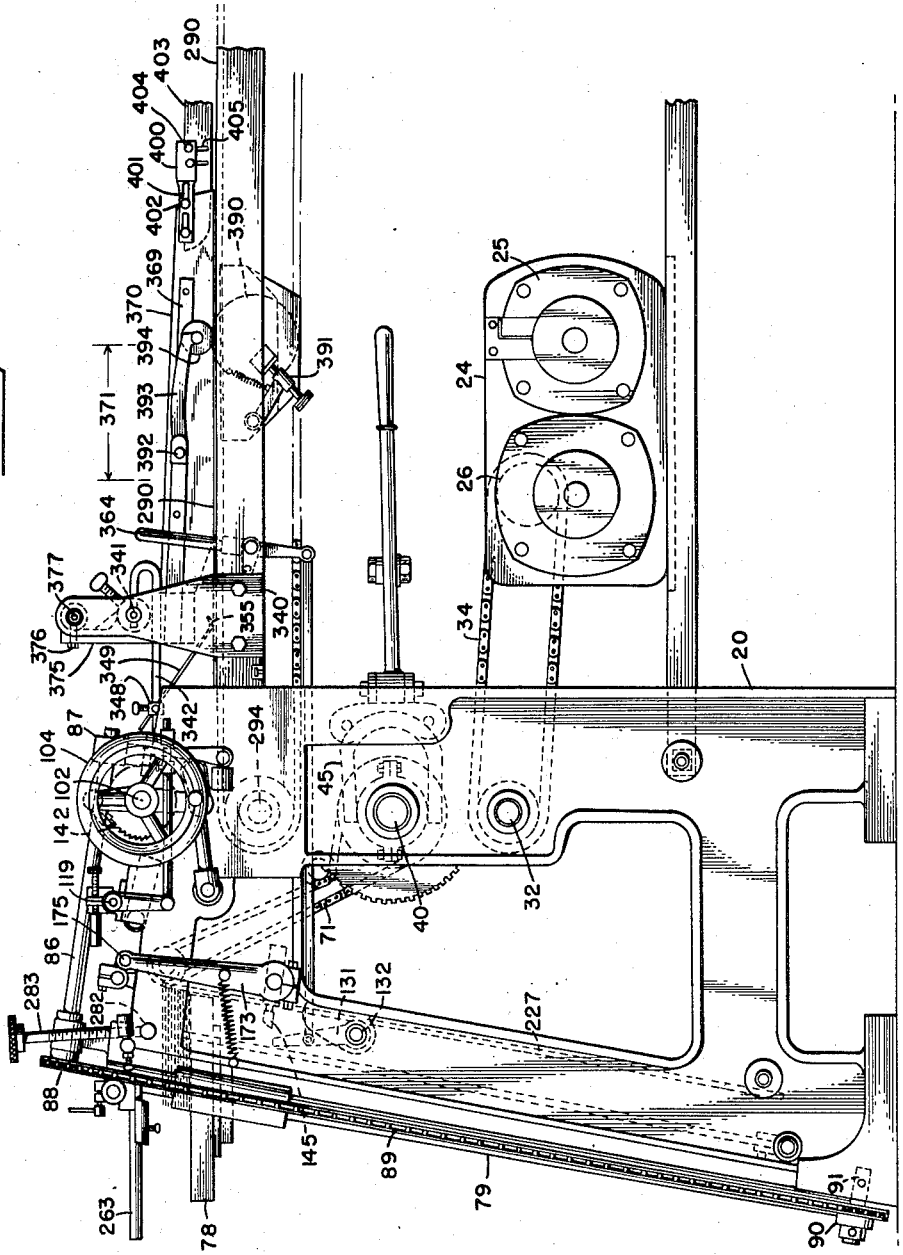

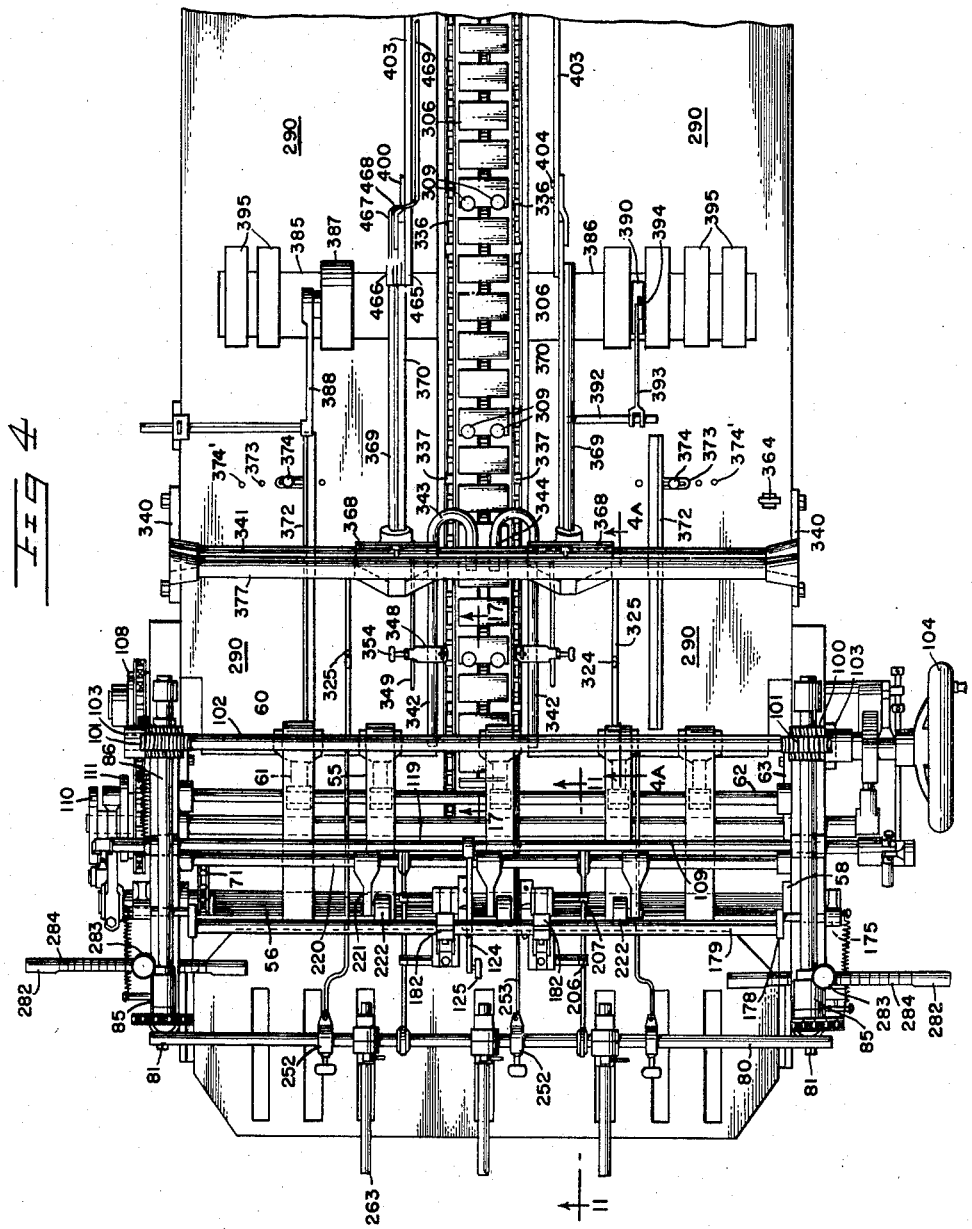

Sept. 15, 1959     A. W. McCLURE     2,903,830
BANDING MACHINE
Filed Nov. 24, 1954     19 Sheets-Sheet 5
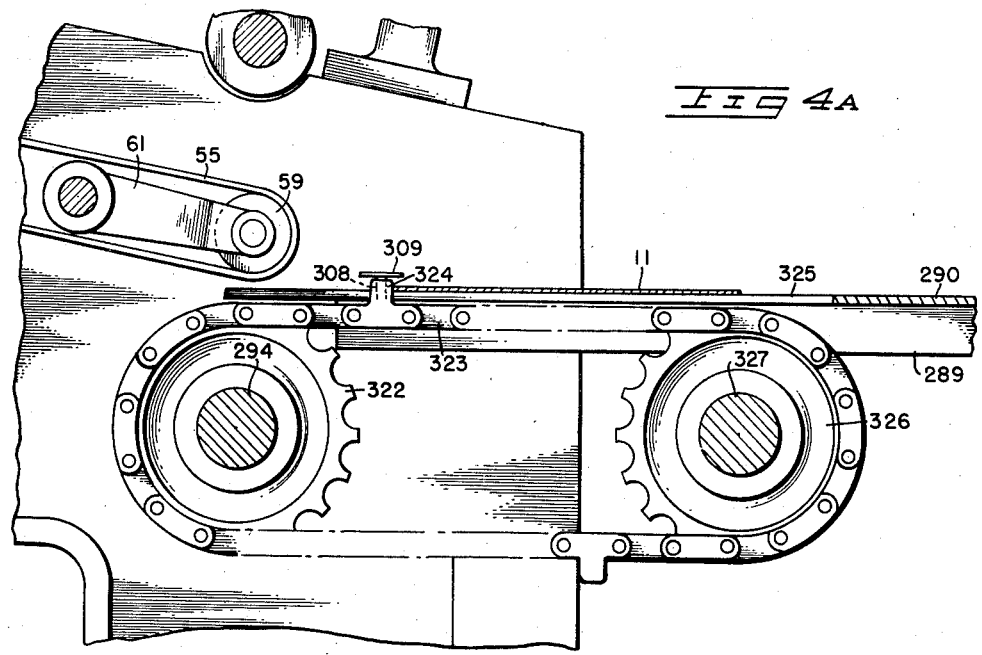
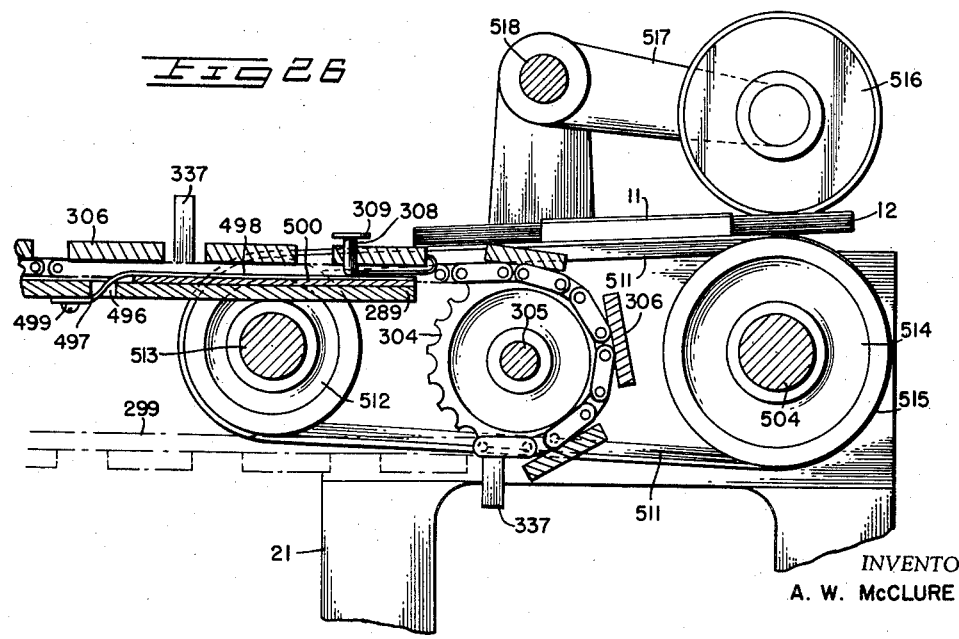
INVENTOR
A. W. McCLURE
BY John H. Phillips
ATTORNEY

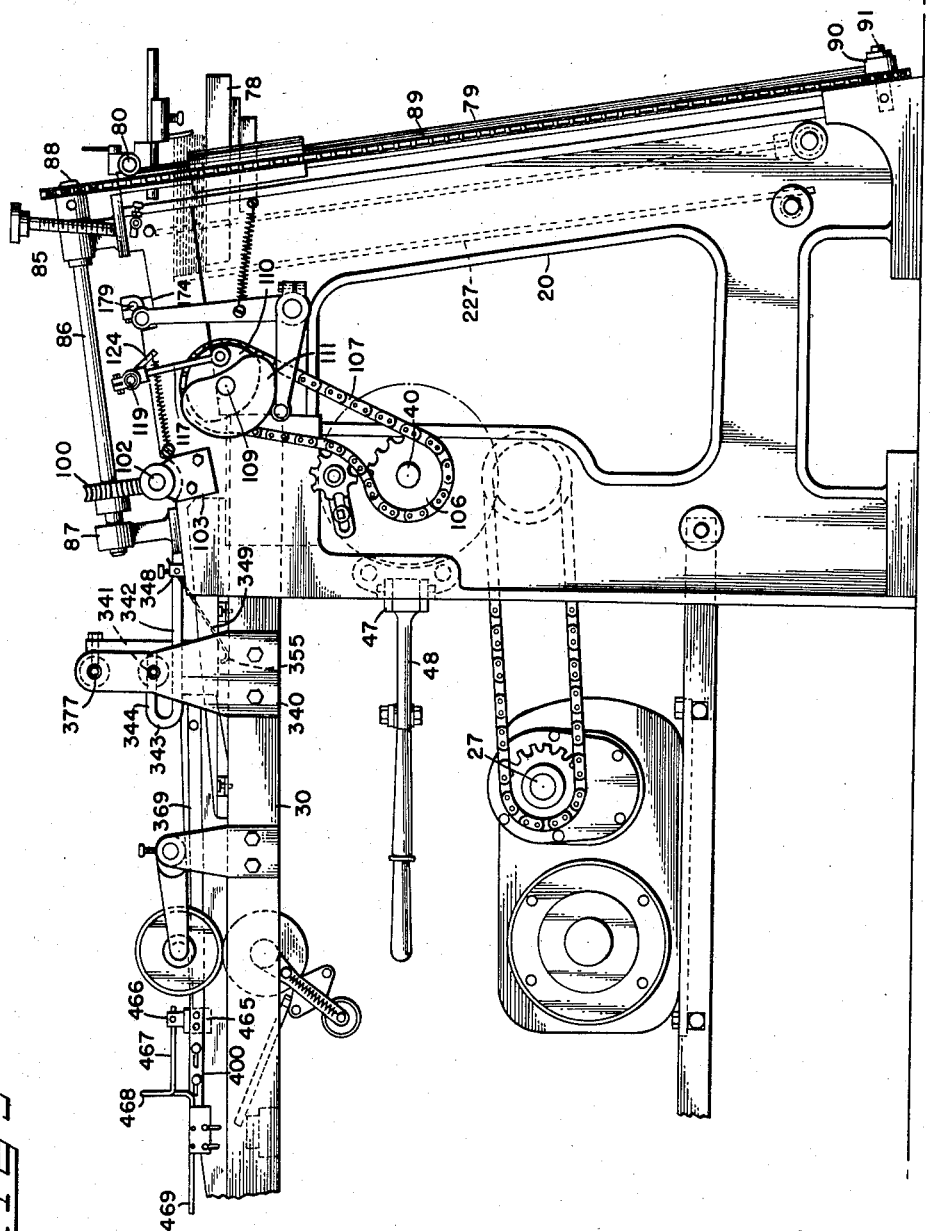

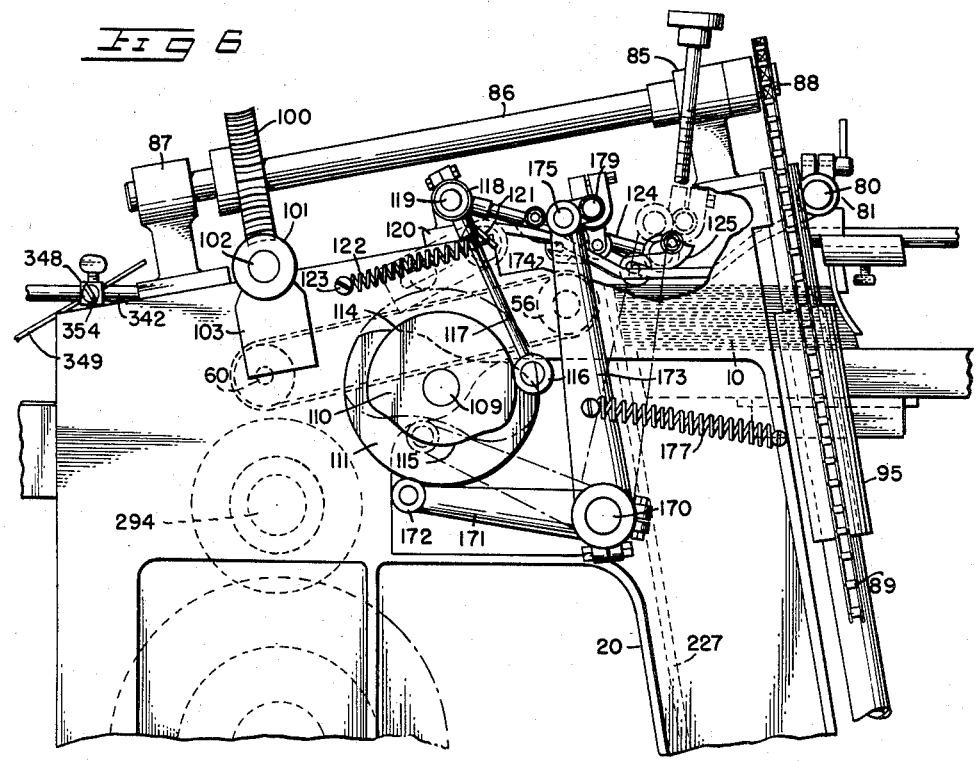

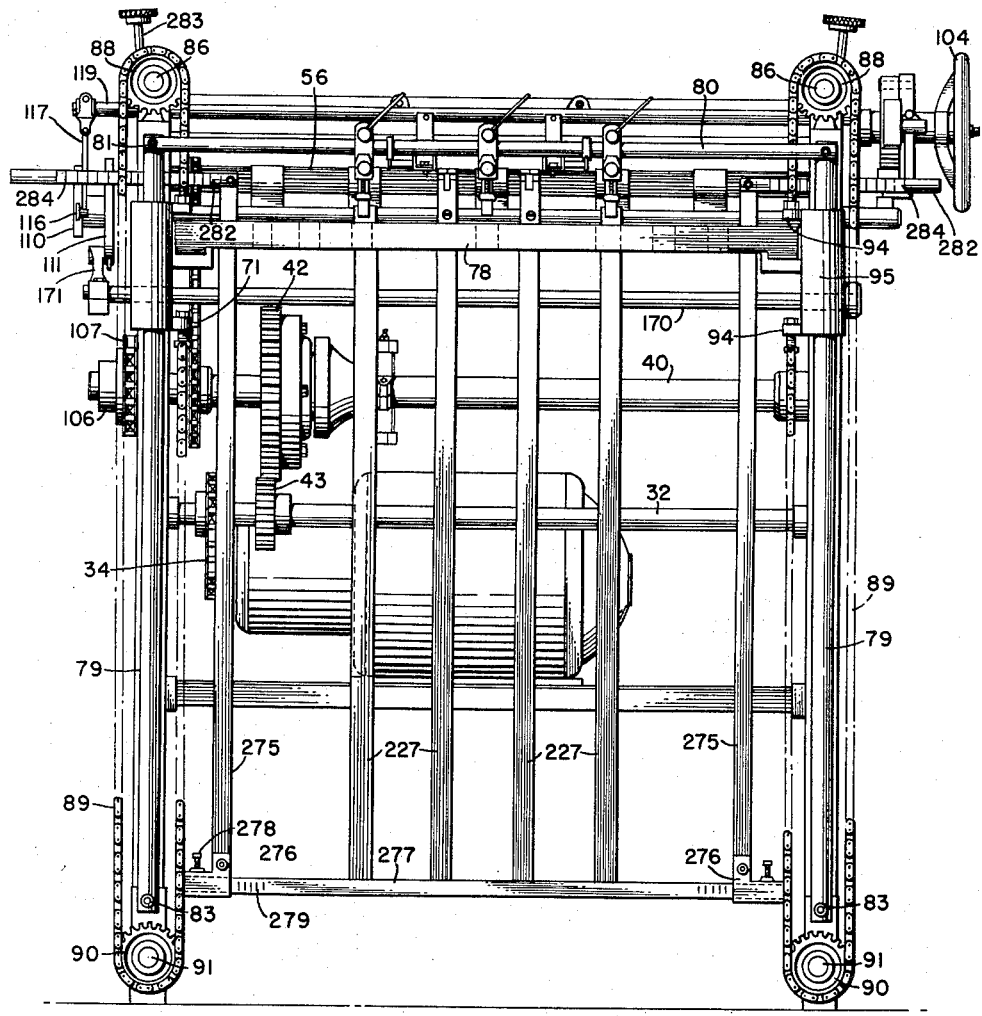

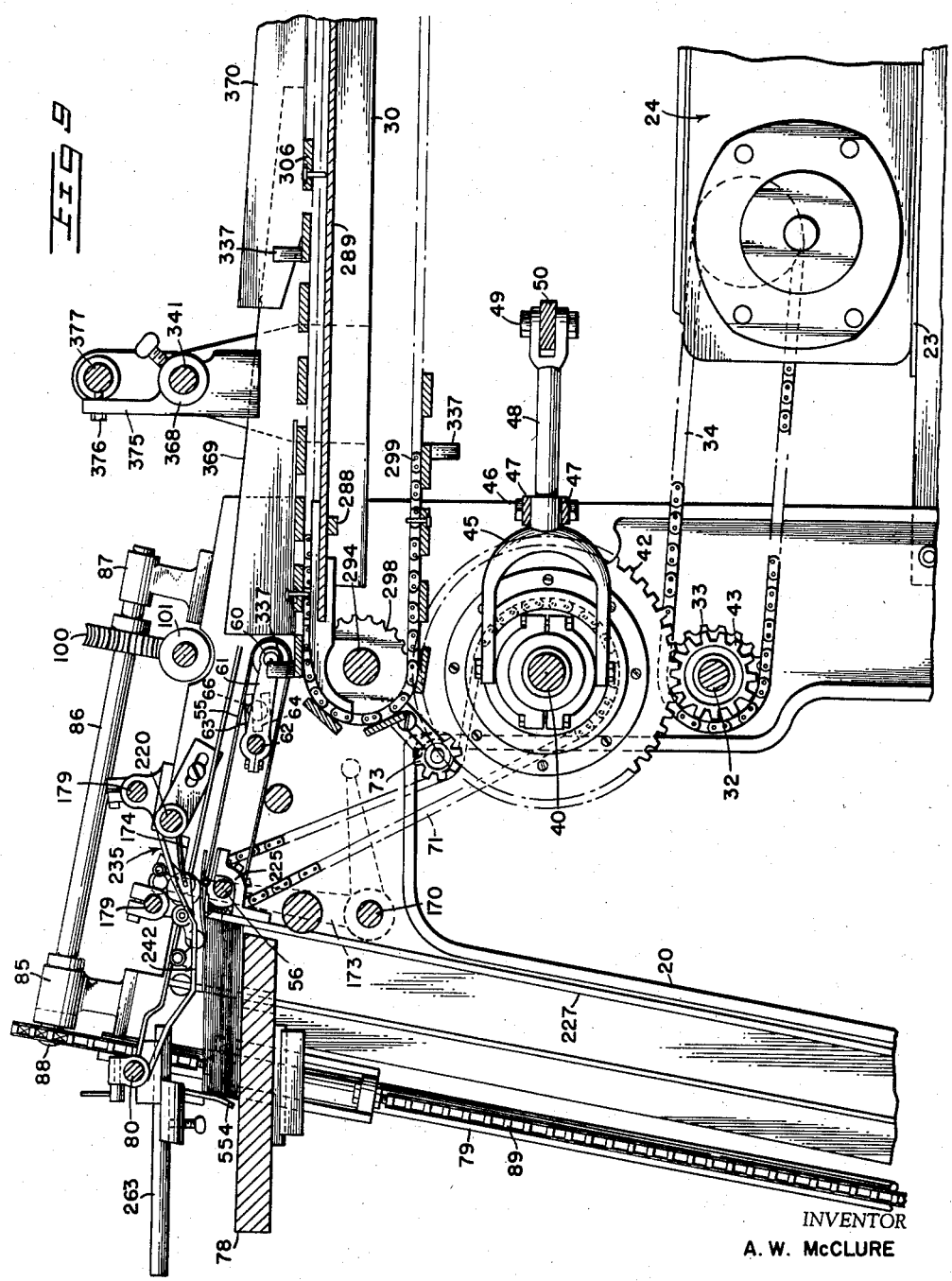

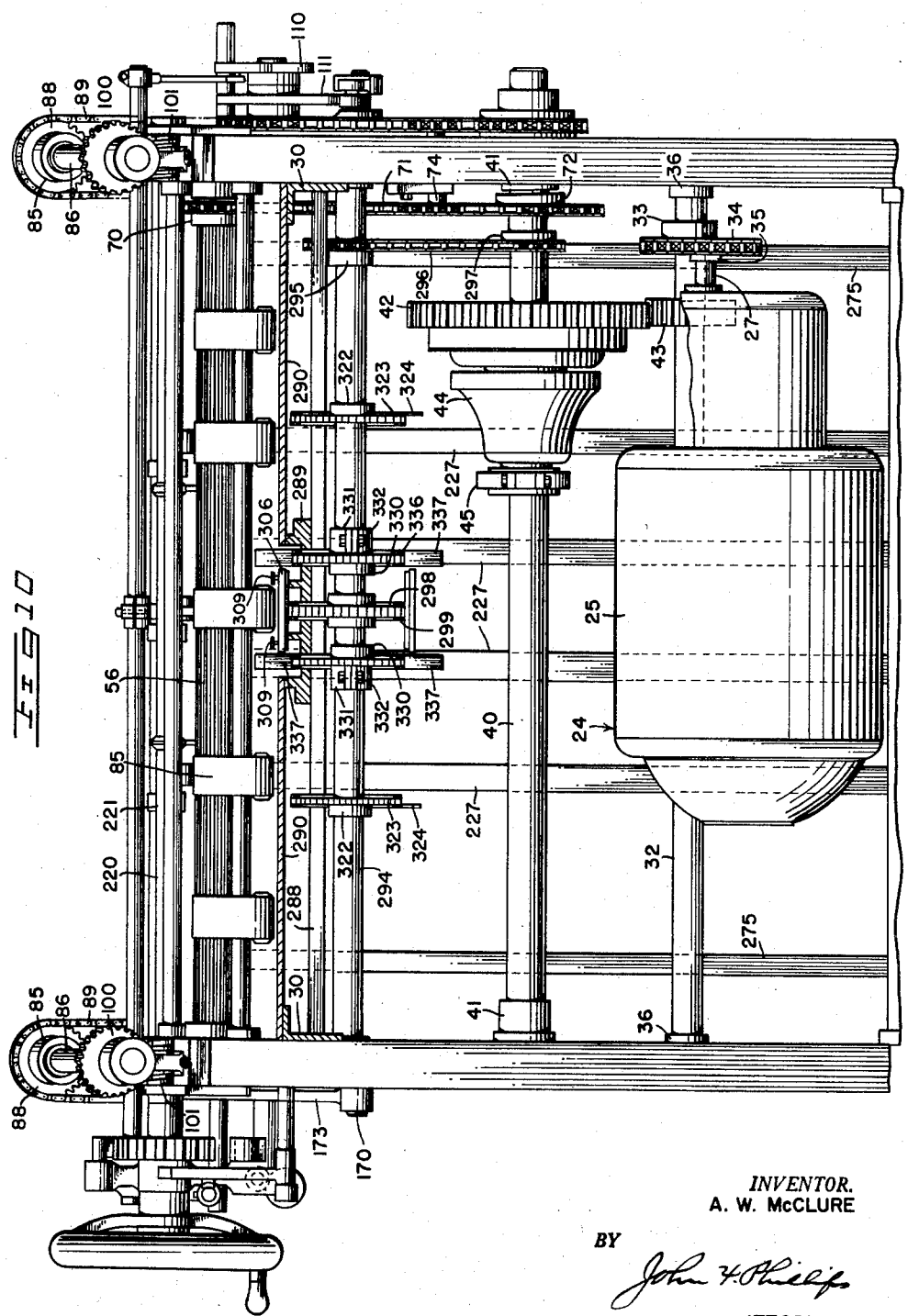

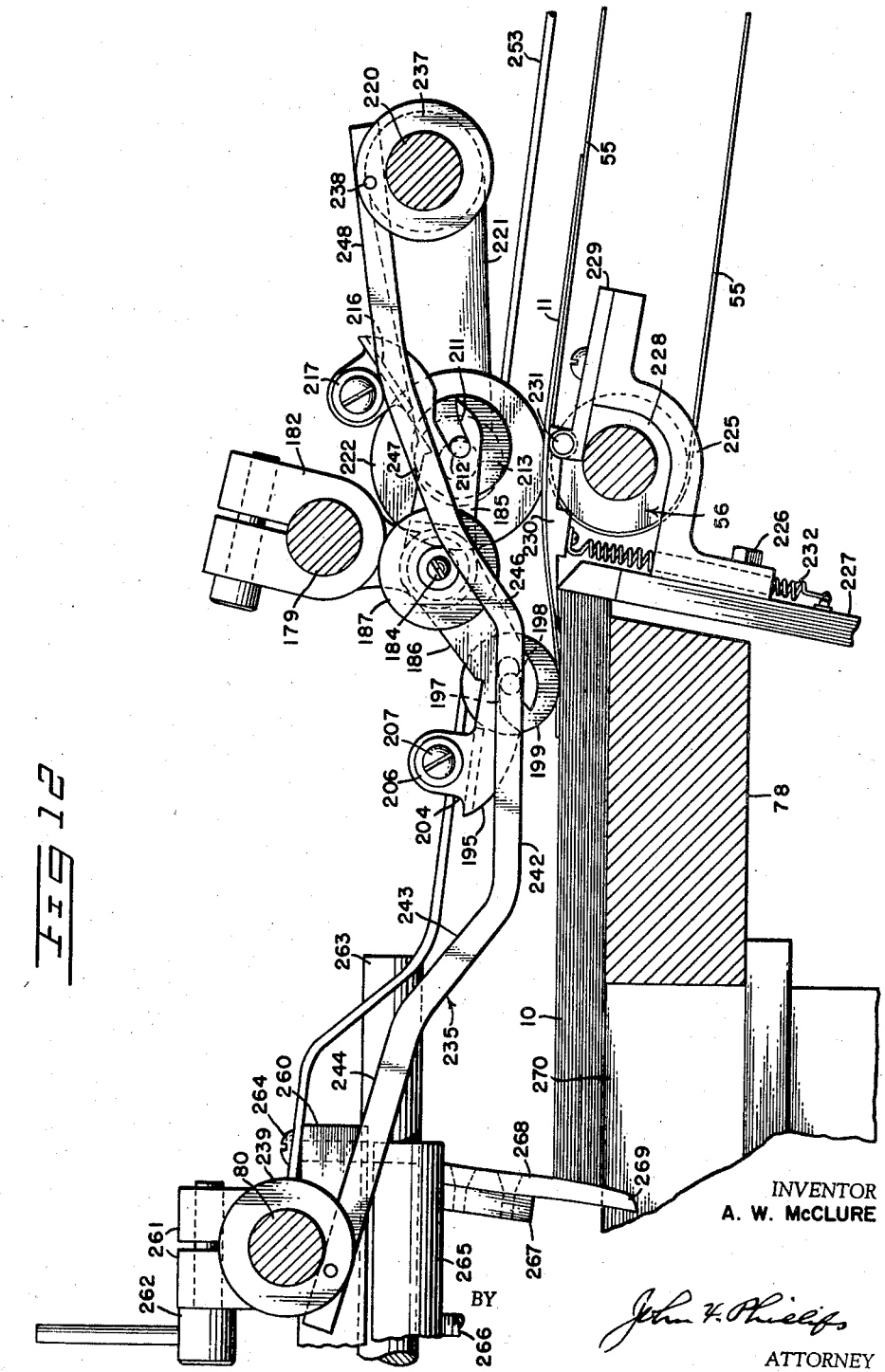

Sept. 15, 1959     A. W. McCLURE     2,903,830
BANDING MACHINE
Filed Nov. 24, 1954     19 Sheets-Sheet 13
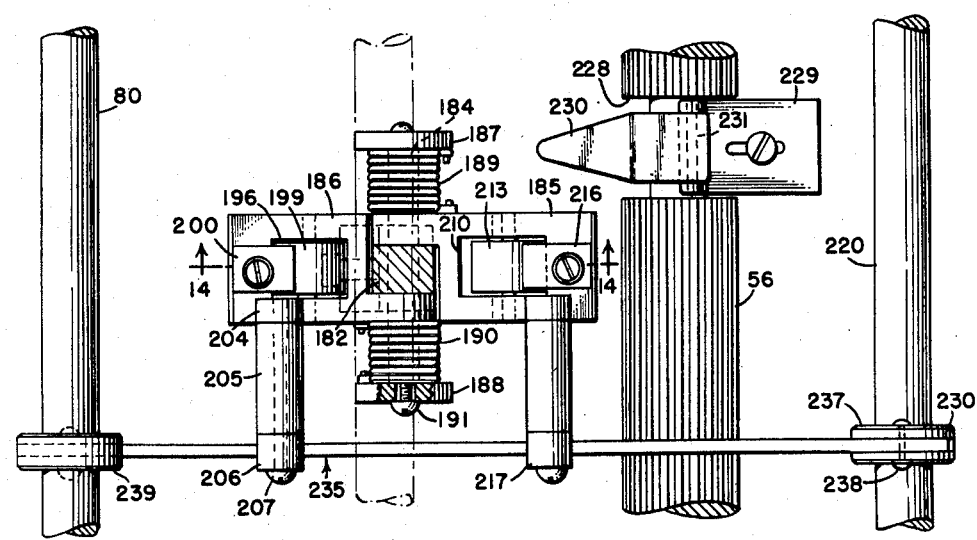
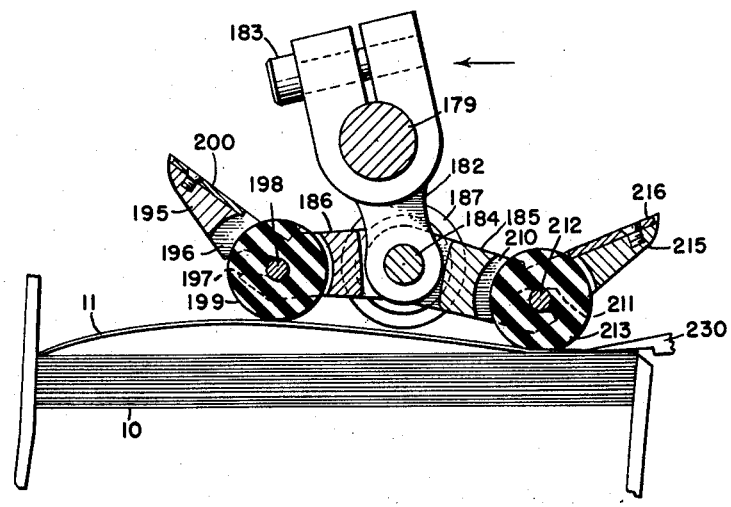
INVENTOR
A. W. McCLURE
BY John F. Phillips
ATTORNEY Sept. 15, 1959 A. W. McCLURE 2,903,830
BANDING MACHINE
Filed Nov. 24, 1954 19 Sheets-Sheet 14
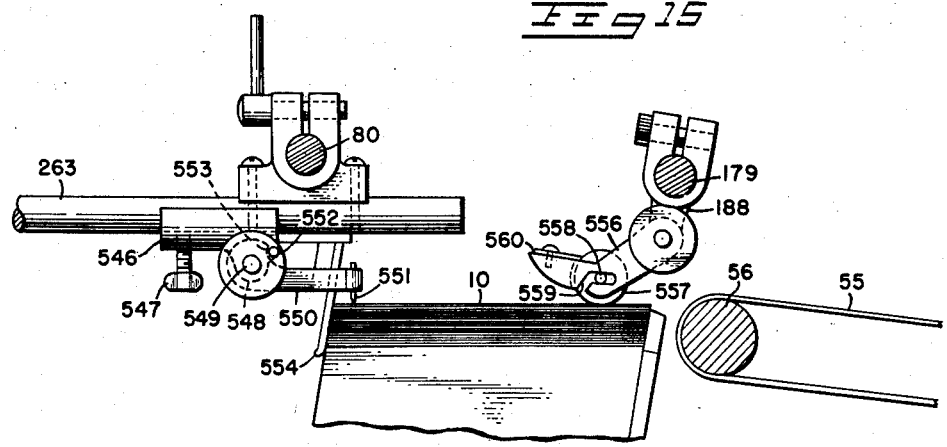
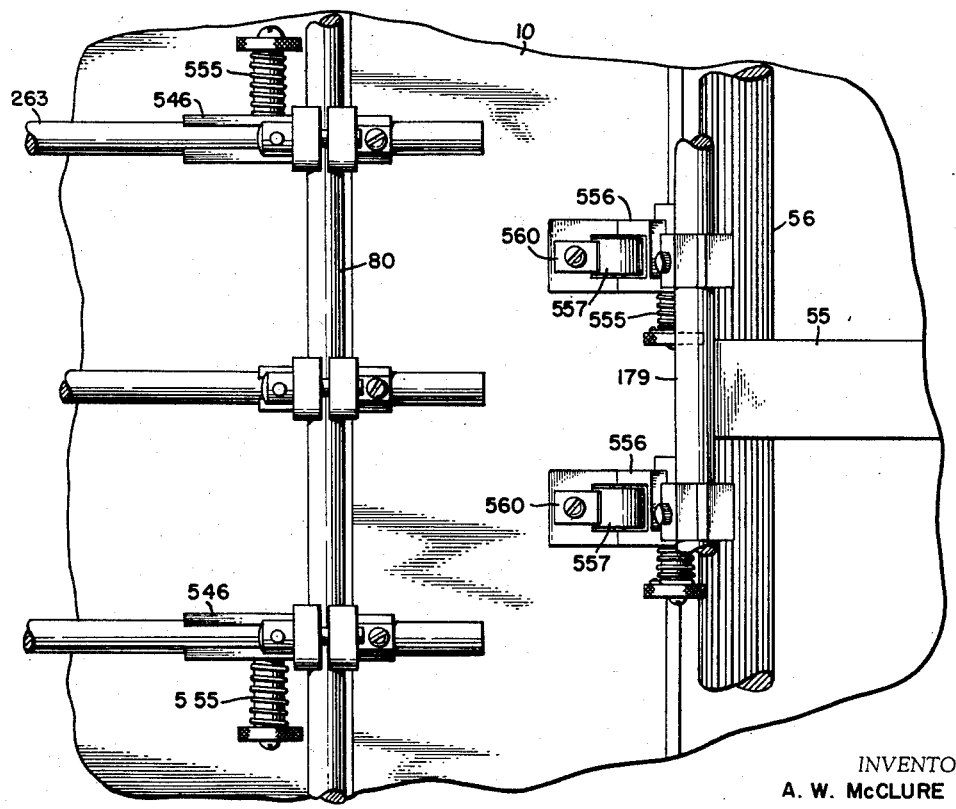
INVENTOR
A. W. McCLURE Sept. 15, 1959  A. W. McCLURE  2,903,830
BANDING MACHINE
Filed Nov. 24, 1954  19 Sheets-Sheet 15

INVENTOR.
A. W. McCLURE
BY
John F. Phillips
ATTORNEY

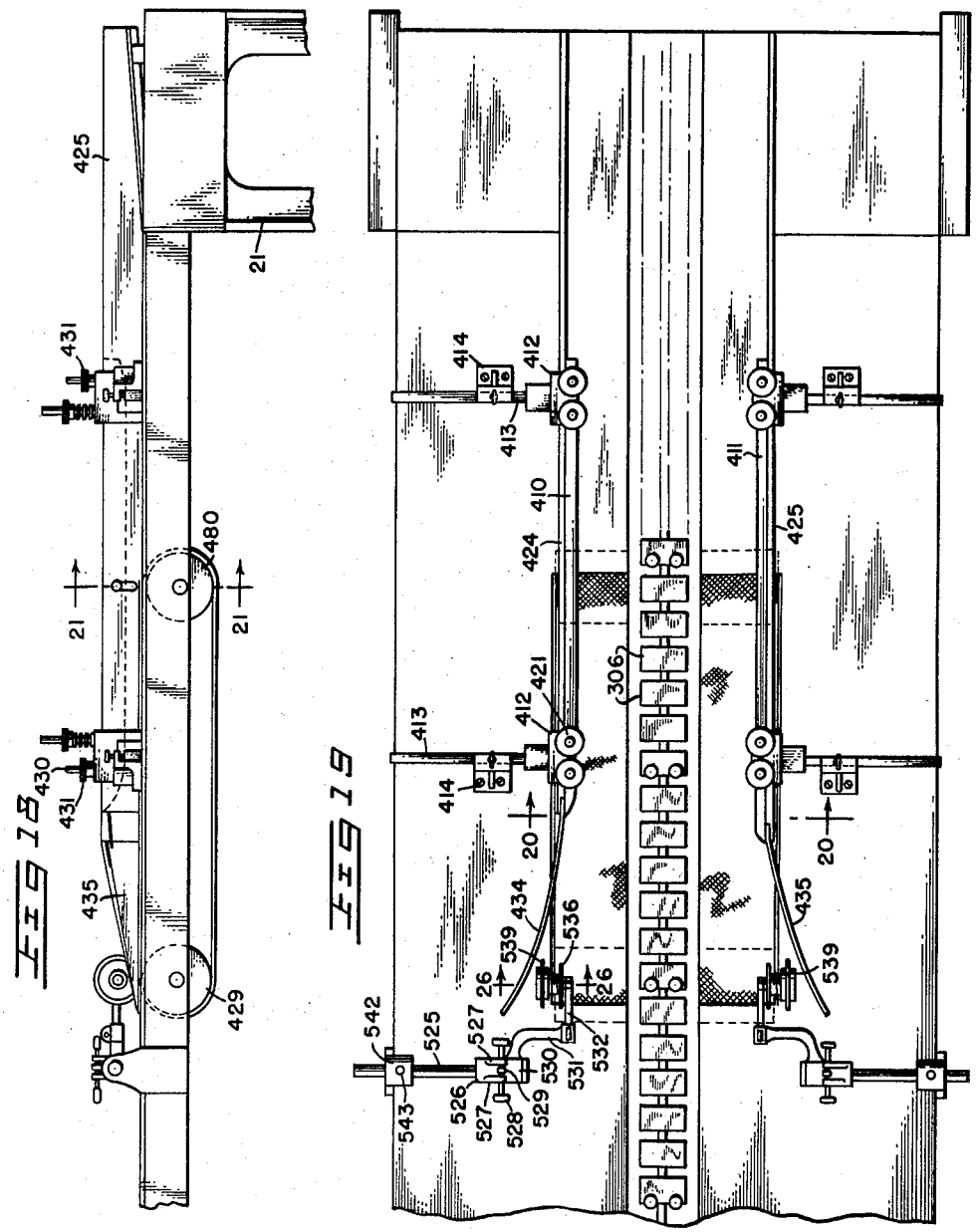

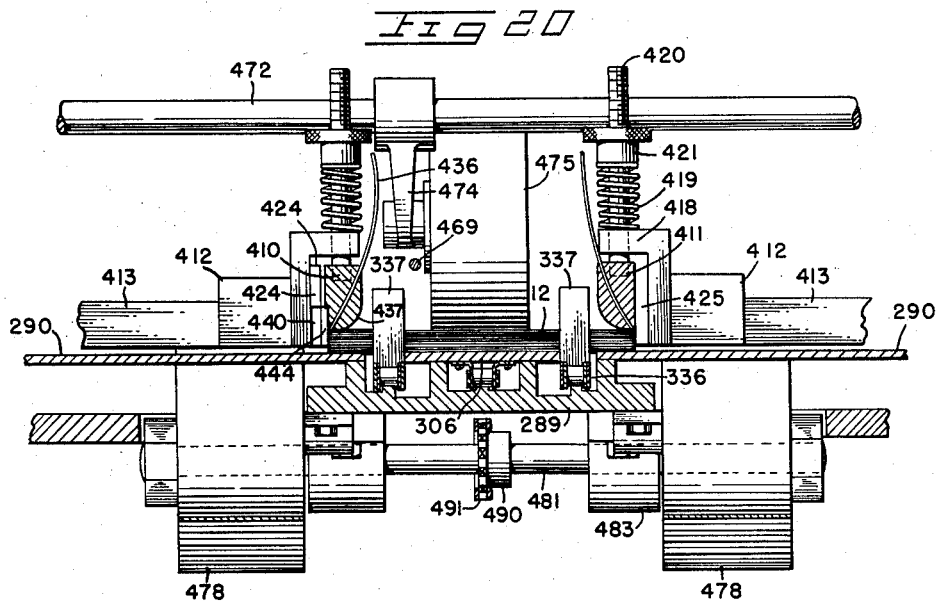
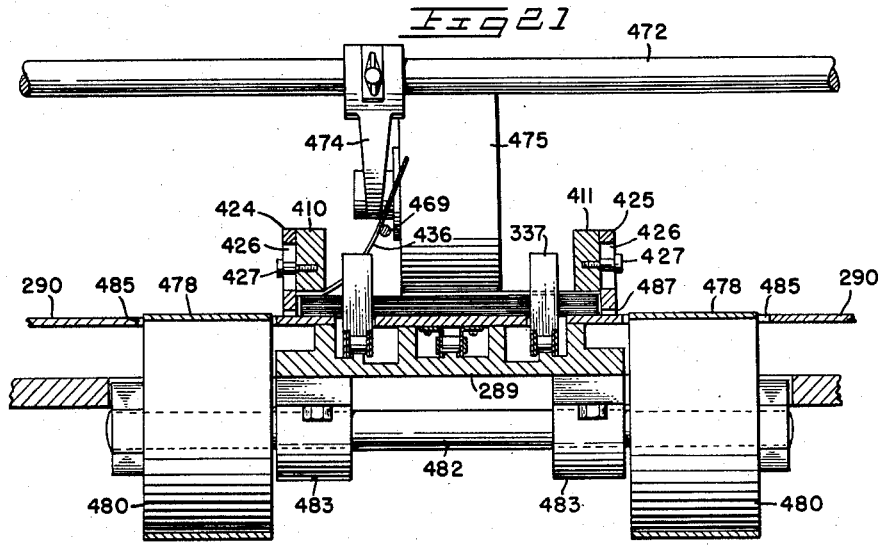

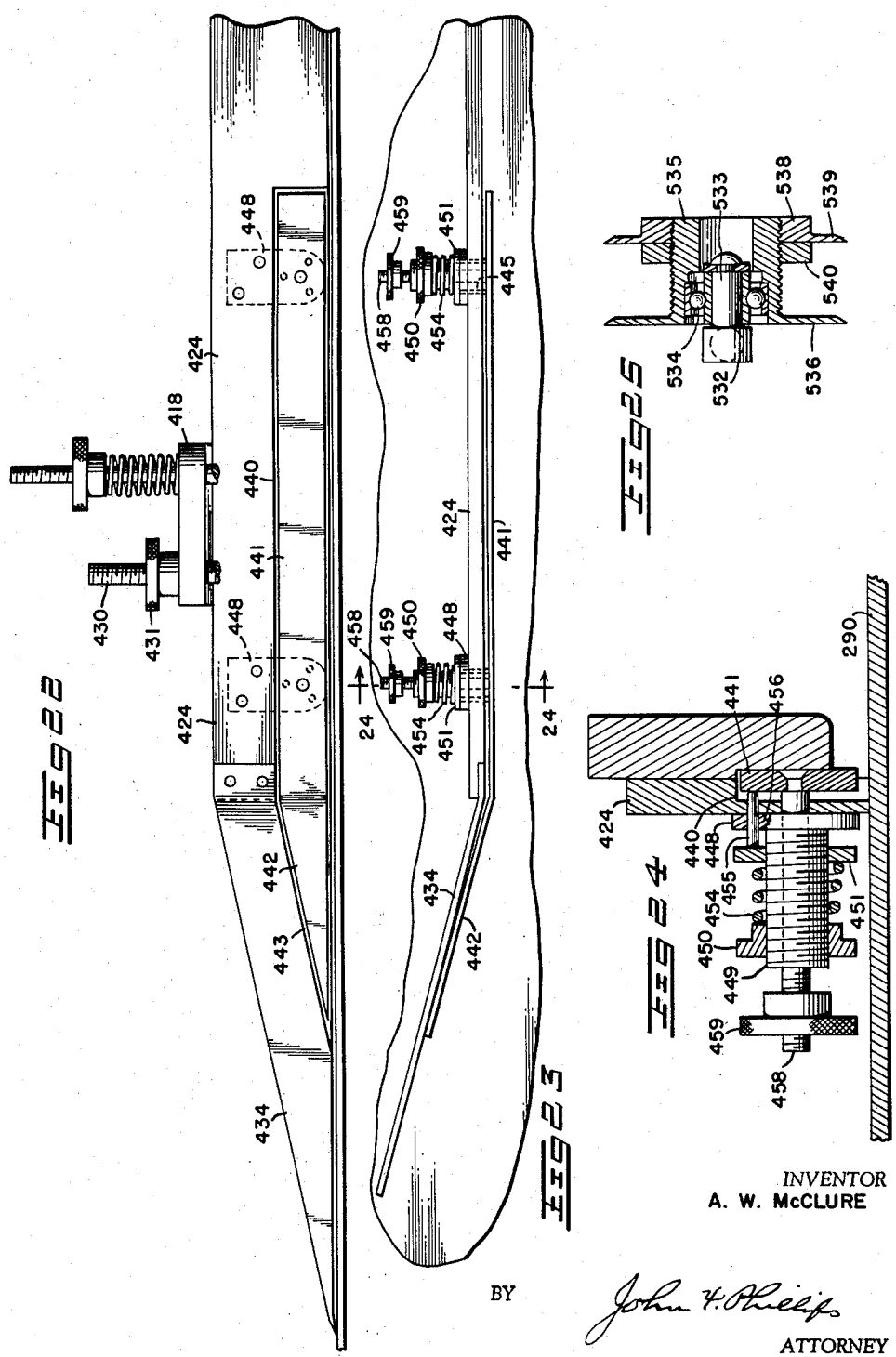

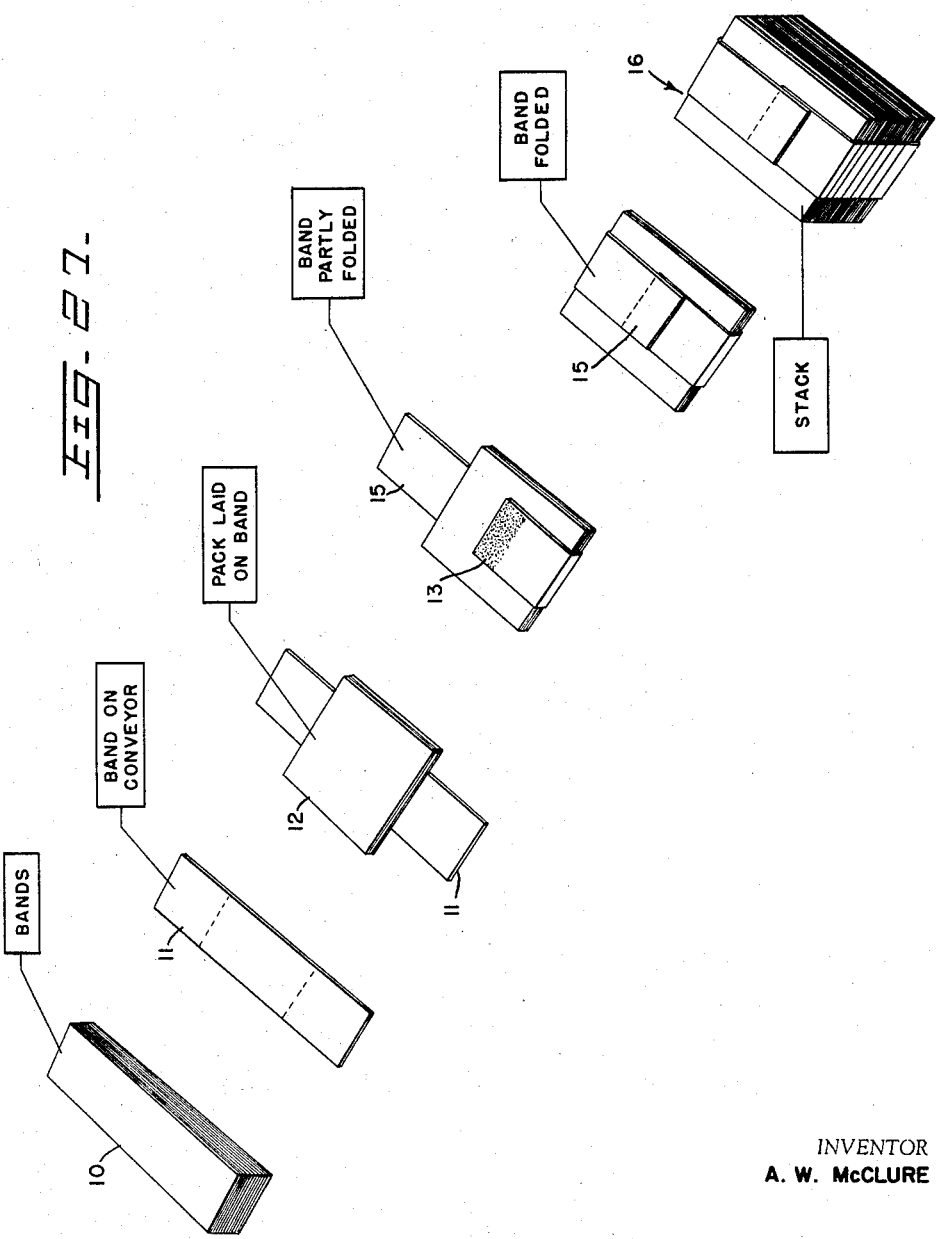

United States Patent Office 2,903,830
Patented Sept. 15, 1959

2,903,830

BANDING MACHINE

Arthur W. McClure, Westfield, N.J., assignor to W. O. Hickok Manufacturing Company, Harrisburg, Pa., a corporation of Pennsylvania Application November 24, 1954, Serial No. 470,861

18 Claims. (Cl. 53—198)

This invention relates to banding machines, and more particularly to machines for placing bands around filler packs for loose-leaf notebooks and the like.

The only machines available for folding bands around packs of paper and gluing the bands to each other have operated step by step, the apparatus being brought to a complete stop for the folding and gluing of each of the bands. The starting and stopping of such an apparatus causes excessive wear due to the inertia of the parts, and the necessity for stopping the apparatus for the application of each band very greatly limits the speed and production of the apparatus.

An important object of the present invention is to provide a continuously operating apparatus for folding bands around packs of paper, packages or any other articles, the complete folding and application of each band taking place while the pack or article, together with the band, moves continuously through the apparatus.

A further object is to provide such an apparatus having novel means for positioning the band and filler pack or other article with respect to each other so that the band will be wrapped centrally of the filler pack.

A further object is to provide conveying means for carrying the filler packs through the apparatus in proper predetermined positions relative to the bands, and to provide easily adjusted means whereby the conveying means for the bands and packs may be adjusted in accordance with different widths of the bands and packs so that each band will be wrapped around the center of the associated pack.

A further object is to provide an apparatus of the character referred to wherein each successive band fed to the apparatus and while moving in flat condition over the bed of the machine, has a line of glue applied beneath one end of the band whereby, when the folding operation takes place, the glued line on such end of the band will face upwardly to adhere to the lower face of the other end of the band when the latter is folded over the pack.

A further object is to provide, in combination with the apparatus referred to, means for feeding successive bands to the apparatus in such a way as to facilitate their engagement with the band positioning means associated with the band conveying mechanism.

A further object is to provide band-engaging elements on the upper run of a band conveyor, and to provide novel means for supplying bands over the top of the conveyor from the inlet end thereof to be engaged by the elements referred to.

Other objects and advantages of the invention will become apparent during the course of the following description.

Figure 2:
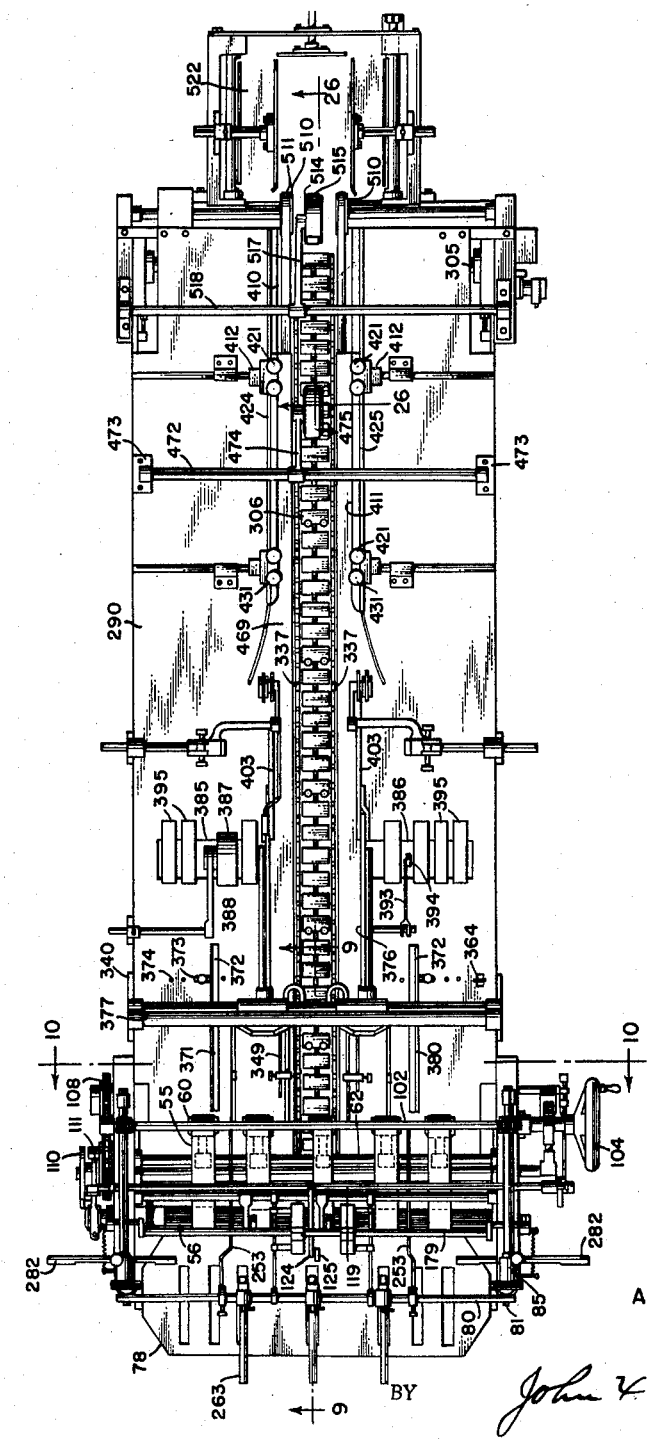
Figure 11:
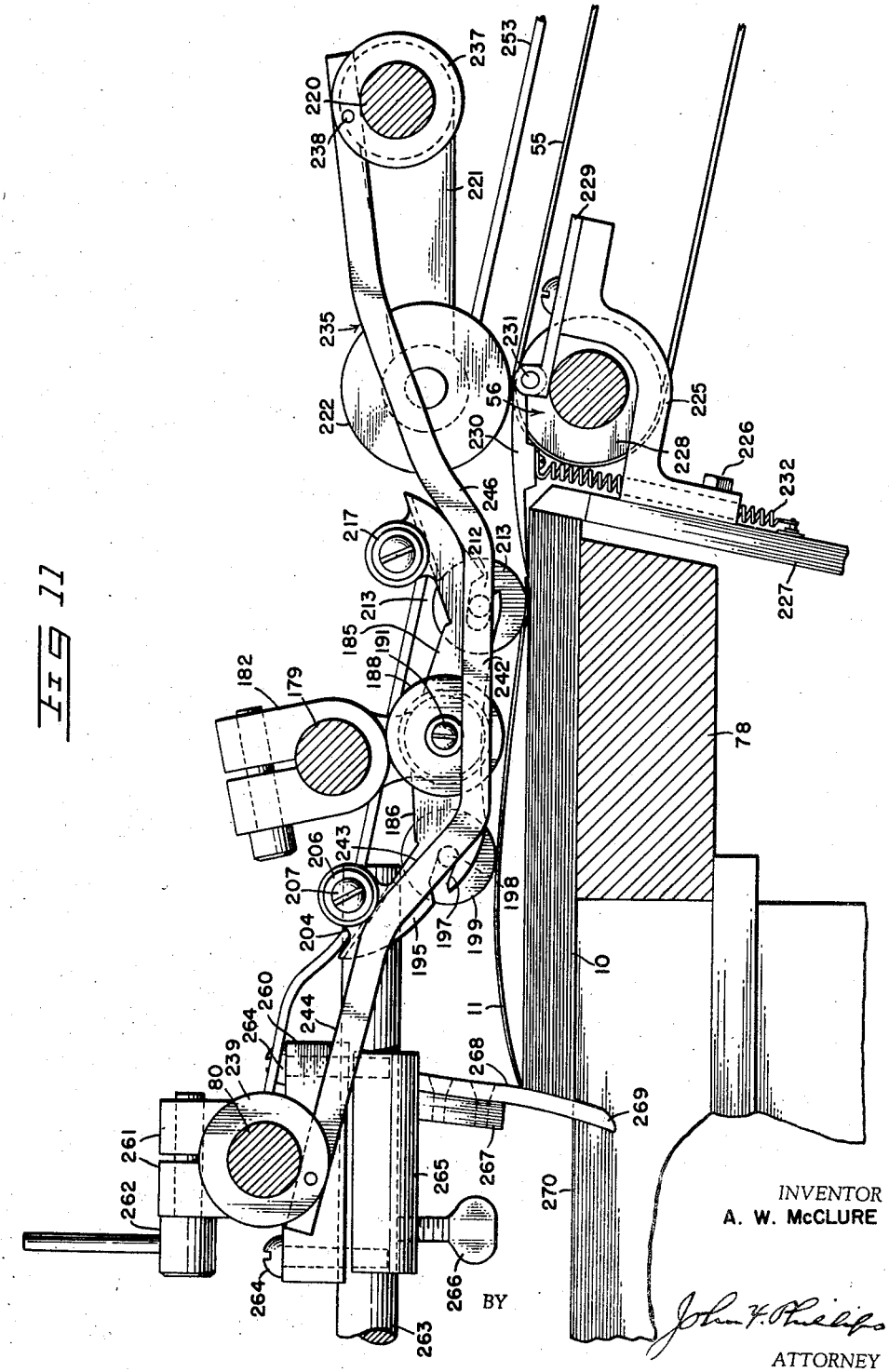
Figure 17:
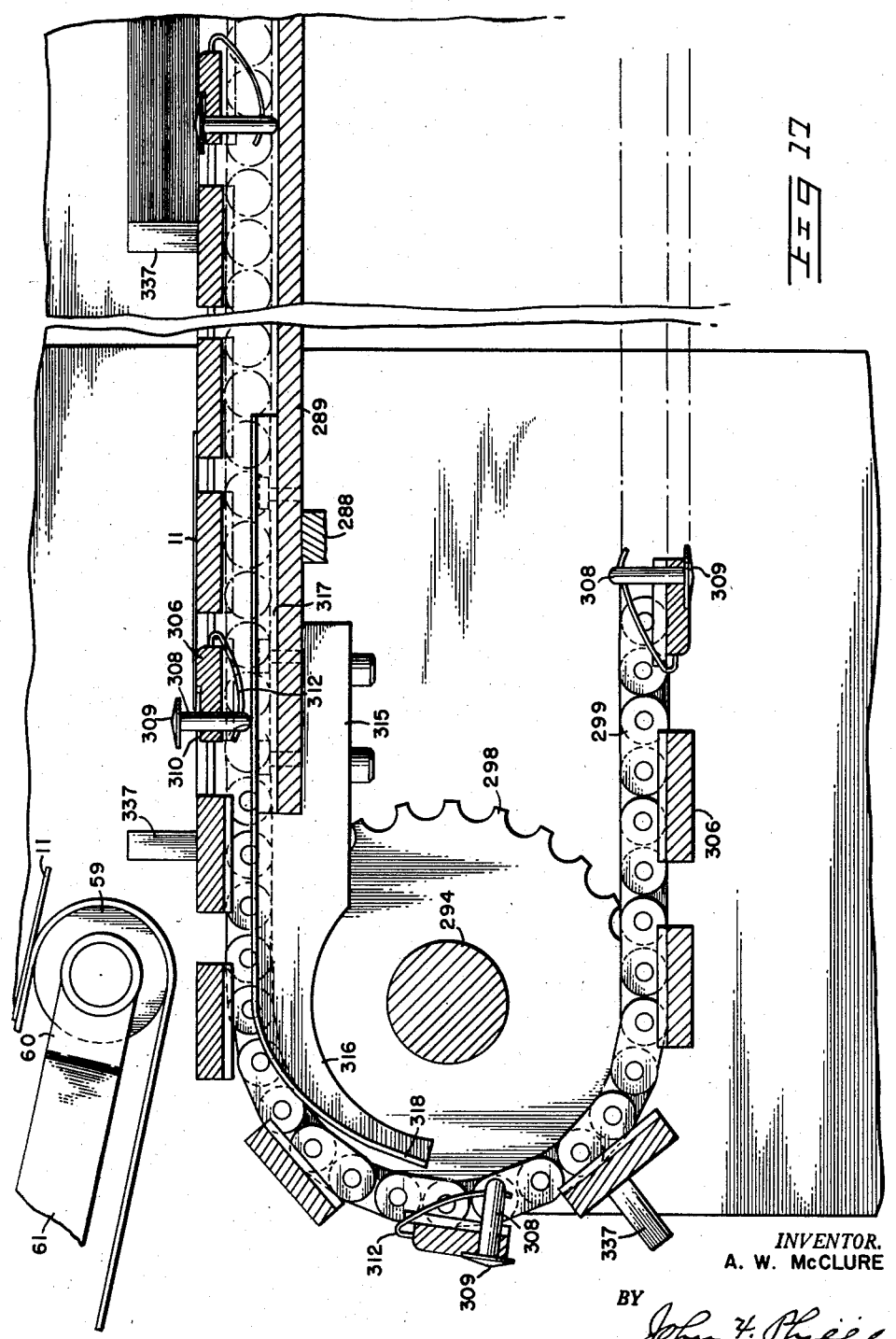

In the drawings I have shown two embodiments of the invention. In this showing:

Figure 1 is a side elevation of the apparatus,
Figure 2 is a plan view of the same,
Figure 3 is an enlarged fragmentary side elevation of the left-hand end of the machine as viewed in Figure 1,
Figure 4 is an enlarged fragmentary plan view of the same end of the machine,
Figure 4A is a detail section on line 4A—4A of Figure 4, showing one of the outer sprocket sets and the chain therefor,
Figure 5 is a side elevation similar to Figure 3 showing the opposite side of the machine,
Figure 6 is an enlarged fragmentary side elevation of a portion of the apparatus shown in Figure 5,
Figure 7 is an enlarged fragmentary side elevation of a portion of the apparatus as viewed in Figure 3,
Figure 8 is an end elevation of the apparatus showing the left-hand end as viewed in Figure 1,
Figure 9 is an enlarged fragmentary sectional view taken on line 9—9 of Figure 2,
Figure 10 is a similar view taken transversely of the apparatus on line 10—10 of Figure 2,
Figure 11 is an enlarged fragmentary sectional view taken on line 11—11 of Figure 4 showing one form of the feeder mechanism,
Figure 12 is a similar view showing the operating parts in different positions,
Figure 13 is an enlarged fragmentary plan view of the portion of the apparatus shown in Figures 11 and 12,
Figure 14 is an enlarged fragmentary sectional view on line 14—14 of Figure 13,
Figure 15 is a fragmentary sectional view similar to Figure 11 showing a modified type of sheet feeding mechanism,
Figure 16 is a plan view of the same,
Figure 17 is an enlarged fragmentary sectional view on line 17—17 of Figure 4,
Figure 18 is an enlarged side elevation of a portion of the apparatus as viewed in Figure 1,
Figure 19 is a plan view of the same,
Figure 20 is an enlarged fragmentary sectional view on line 20—20 of Figure 19,
Figure 21 is a similar view on line 21—21 of Figure 18,
Figure 22 is a face view of one of the guide plates associated with one of the folding bars, the latter being omitted,
Figure 23 is a plan view of the same, the longitudinally movable take-up plate being shown laterally displaced from beneath the guide plate for the purpose of illustration,
Figure 24 is an enlarged fragmentary sectional view on line 24—24 of Figure 23,
Figure 25 is a similar view on line 25—25 of Figure 19,
Figure 26 is a section on line 26—26 of Figure 2, and
Figure 27 is a diagrammatic perspective view illustrating successive stages in the banding of a stack of sheets in accordance with the operation of the apparatus.

The present application covers broadly the general features of construction and operation of the apparatus, including broadly the band positioning means, the glue applying means and the band folding means, all in combination in an apparatus wherein the bands and filler packs, or other articles to be banded, move continuously through the apparatus. Improvements in these and other features and combinations are disclosed in the co-pending application of Harry L. Hershey, Serial No. 477,318, filed December 23, 1954.

The present apparatus performs a sequence of operations occurring generally as diagrammatically illustrated in Figure 27, to which reference will first be made. The apparatus, as previously stated, is particularly intended for the banding of loose-leaf notebook fillers or packs.

Referring to Figure 27 the numeral 10 designates a stack of bands at one end of the machine, used individually for wrapping filler packs in the operation of the apparatus. By suitable mechanism to be described, one band at a time is fed from the top of the stack into the machine, one such band being indicated by the numeral 11. This band advances by means to be described to the point where one of the filler packs is to be fed to the machine, and it will become apparent that the band 11 advances continuously through the apparatus. When the loading station for the filler is reached, an operator will place a filler pack 12 on the band as shown in Figure 27.

The band and the filler thereon advance past a gluing station at which glue is applied to the lower face of one end of the band as indicated by the numeral 13. Means to be described comes into operation after the application of glue to the band for folding over the filler the two ends of the band. The glued end of the band is first turned over the top of the filler, following which the other end 15 of the band is folded over the top of the glued surface, whereupon roller means applies pressure to the top face of the band end 15 to cause the two ends of the band to adhere to each other. The filler at this point will have been completely banded, and successive banded fillers will then feed from the outlet end of the apparatus and be stacked as indicated by the numeral 16.

Referring particularly to Figures 1-10, inclusive, the numeral 20 designates the main frame at one end of the apparatus while the numeral 21 designates a supplemental frame at the opposite or outlet end of the apparatus, these frames being connected by suitable longitudinal frame elements 22 and such supplemental bracing means as may be required. The bars or frame elements 22 support a transverse plate 23 upon which is mounted a power unit indicated as a whole by the numeral 24 and comprising a motor 25 and a preferably variable power reduction unit 26, the output power shaft 27 (Figure 10) of which is employed for driving the various operating units of the apparatus as described in detail below.

The frame elements 22 described above are spaced above the top of the apparatus as clearly shown in Figure 1. Adjacent the top of the apparatus, two relatively heavy longitudinal side frame members 30 are fixed at their ends to the supporting frame units 20 and 21. Most of the mechanisms for accomplishing the sequence of operations diagrammatically shown in Figure 27 are supported by the frame members 30, as will become apparent below.

A countershaft 32 is provided with a sprocket 33 around which passes a chain 34, and this chain passes around a sprocket 35 on the output shaft 27. During the operation of the apparatus, therefore, the countershaft 32 will be constantly driven. This shaft may be mounted in any suitable bearings, generally shown in Figure 10 and indicated by the numeral 36.

Above the shaft 32 is a drive shaft 40 similarly journaled at its ends in any desired type of bearings 41. Rotatable on the shaft 40 is a gear 42 meshing with a pinion 43 carried by the shaft 32. A conventional clutch 44 is keyed to the shaft 40. The clutch 44 is shiftable by a fork 45 pivoted as at 46 to a pair of cross bars 47, beyond which projects an arm 48 carried by the fork 45. The arm 48 is pivoted as at 49 (Figure 9) to an operating rod 50, and the outer end of the rod 50 is pivotally connected as at 51 to an operating lever 52 which, in turn, is pivoted as at 53 to the cross bars 47. It will be apparent that when the operating lever 52 is operated, the clutch 44 will be engaged and the shaft 40 will be positively and constantly driven.

A plurality of tapes 55 form conveying means for carrying successive bands to the means employed for feeding the bands to the filler loading station. The tapes 55 at the left-hand end as viewed in Figures 2 and 4 pass around a knurled roller 56 having reduced shaft ends journaled in suitable bearings 58 (Figure 4) fixed to the inner faces of the main frame 20. The right-hand ends of the tapes 55 pass around individual rollers 59 (Figure 17). Each of these rollers, in turn, is rotatably supported by a yoke 60, each of which is carried by an arm 61. The ends of the arms 61 opposite the yokes 60 are clamped to a cross shaft 62. The ends of the shaft 62 are carried by arms 63 slotted as at 64 for the reception of screws 66 fixed to the sides of the main frame 20. Loosening the screws 66 permits adjustment of the shaft 62 to adjust properly the tension of the belts 55.

Adjacent one side of the main frame 20, the knurled roller 56 (Figure 10) carries a sprocket 70 about which passes a chain 71, and the lower end of this chain passes around a sprocket 72 on the drive shaft 40. Accordingly, the knurled roller 56 and the tapes 55 will be constantly driven. The chain 71 passes around a suitable idling and chain-tightening sprocket 73 (Figure 9) carried by shaft 74 (Figure 10).

The means for supplying bands 11 to the conveyor tapes 55 forms per se no part of the present invention, but will be generally described. A table 78 is mounted for sliding movement on rods or shafts 79 bridged at the top thereof by a transverse shaft 80. Each end of the shaft 80 is fixed to the main frame 20 by a screw 81 (Figure 2) which also passes through and fixes to the frame the upper end of the adjacent rod 79. The lower ends of the rods 79 are fixed to the main frame 20 by similar screws 83 (Figure 8).

Each side of the main frame 20 is provided at the top thereof with a bearing 85 (Figures 6 and 9), and each of these bearings rotatably supports one end of a shaft 86, the other end of which is supported by a bearing 87, also carried by the top of the main frame member 20. Each shaft 86 carries a sprocket 88 about which passes a chain 89. The lower end of each chain 89 passes around a sprocket 90 carried by a shaft 91 fixed to the main frame 20. The ends of each chain 89 are connected as at 94 (Figure 8) to a guide block 95 vertically slidable on the adjacent rod 79 and secured to the ends of the table 78. It will be noted that the rods 79 are inclined from the vertical and that the shafts 86 lie in a plane perpendicular to the plane of the rods 79 and chains 89. The purpose of this is to incline the stack of bands to prevent the latter, when a tall stack is used, from falling outwardly from the apparatus.

Each shaft 86 carries a worm wheel 100, and the teeth of the worms of the two shafts 86 are oppositely pitched so as to move the inner runs of the chains 89 simultaneously in the same direction upon rotation of the two shafts 86. Each worm wheel 100 meshes with a worm 101. The worms 101 are carried by a shaft 102 extending entirely across the apparatus and supported in bearings 103 carried by the main frame 20.

Means are provided for progressively raising the table 78 to properly position the uppermost sheet 11 of the stack 10 to be fed to the tapes 55. Referring to Figure 5, one end of the shaft 40 carries a sprocket 106 about which passes a chain 107 the upper end of which passes around a sprocket 108 (Figure 4) mounted on a shaft 109 carrying a pair of cams 110 and 111. The cam 111 is utilized in the mechanism for feeding bands from the pack 10 to the tapes 55 in a manner to be desscribed below.

The cam 110 is provided with a high concentric portion 114 and a low point 115, and such cam is engaged by a roller 116 carried by an arm 117 projecting downwardly from a collar 118. The collar 118 is mounted on a rock shaft 119 extending across the apparatus and supported by bearings 120. A depending pin 121 fixed to shaft 119 is connected to one end of a spring 122 the other end of which is anchored as at 123 to the adjacent main frame member 20. This spring therefore maintains the roller 116 in engagement with the cam 110.

Intermediate the width of the apparatus the shaft 119 has fixed thereto one end of an arm 124 (Figures 4 and 6) the free end of which carries a roller 125 resting upon the top band of the stack 10. It will be apparent that the roller 125 prevents movement of the roller 116 inwardly toward the shaft 109 when the concentric portion of the cam 114 passes the roller 116, unless the top level of the stack 10 has dropped to a predetermined point, as will become apparent below.

At the side of the apparatus opposite the cam 110, as shown in Figure 7, the shaft 119 carries a collar 128 provided with a depending arm 129 pivotally connected at its lower end to a rod 130. The other end of the rod 130 is slidable through a rocker arm 131 pivoted at its lower end as at 132 to the adjacent main frame 20. The arm 131 is provided with an offset weight 133 which biases the arm for swinging movement to the left of the position shown in Figure 7. The rod 130 moves back and forth from right to left in Figure 7 to control the arm 131 and is provided with adjustable collars 134 and 135 on opposite sides of the arm 131. Above the rod 130, the arm 131 is provided with a shoulder 136 for a purpose to be described.

At the side of the apparatus adjacent the arm 131 and associated elements, the shaft 102 has journaled thereon a rocker 140 the upper end of which carries a pawl 141 engageable with ratchet teeth 142 formed on the periphery of a wheel 143 fixed to the shaft 102. Turning of the wheel 143 counterclockwise as viewed in Figure 7 rotates the worms 101 (Figure 6) to operate the shaft 86 and thus raise the table 78. The rocker 140 carries a projecting finger 145 normally overlying and resting on the shoulder 136, as shown in Figure 7. Under conditions to be described, the shoulder 136 is moved from beneath the finger 145 by engagement of the collar 135 with the arm 131. To adjust the throw of the rod 130, the shaft 119 is provided with a collar 148 having fingers 149 and 150 spaced on opposite sides of an upstanding finger 151 carried by the collar 128. An adjusting screw 152 is carried by the finger 150, and the finger 149 carries a tube 153 in which is arranged a spring 154 engaging a pin 155 contacting the finger 151. The spring 154 maintains the finger 151 in engagement with the screw 152 which is adjustable to move the finger 151 and rock the arm 129.

The shaft 109, at the side of the apparatus opposite the cams 110 and 111, is provided with an eccentric 160 operating in a sleeve 161 to which is connected one end of a rod 162. The other end of this rod carries a slotted head 163 in which is slidable a pin 164 carried by the lower end of the rocker 140. The lower end of the rocker 140 is connected to one end of a tension spring 165 the other end of which is anchored as at 166. The spring 165 thus tends to maintain the pin 164 in the left-hand end of the slot in head 163 as viewed in Figure 7.

A shaft 170 extends across the apparatus and is journaled in the main frame members 20. At the side of the machine adjacent the cam 111, the shaft 170 carries an arm 171 having a roller 172 engaging the cam 111 as shown in Figure 6. The shaft 170 outwardly of each frame member 20 has fixed thereto the lower end of a rocker 173. The upper edge of each frame member 20 is cut away as at 174 to provide a clearance for a shaft 175 extending across the apparatus and connected at its ends to the upper ends of the rocker arms 173. A spring 177 is connected to each arm 173 to bias it to the right as viewed in Figure 6 and to the left as viewed in Figure 7. Adjacent each arm 173, the shaft 175 is provided with a plate 178, and these plates support a cross shaft 179 lying wholly within the frame members 20. This shaft is offset to permit it to move to the forward position shown in dotted lines in Figure 7.

The shaft 179 carries a plurality of arms 182 clamped to the shaft as at 183. Preferably, two of the arms 182 and associated elements are employed. The lower end of each arm 182 carries a shaft 184 fixed thereto and supporting a pair of oppositely extending rockers 185 and 186. The shaft 184 extends substantially beyond opposite sides of the rockers 185 and 186 and is provided at its ends with collars 187 and 188. Torsion springs 189 and 190 surround the projecting ends of the shaft 184. The spring 189 has one end connected to the collar 187 and its other end connected to the rocker 185 to urge the free end of the latter downwardly as viewed in Figure 14. Similarly, the spring 190 has one end connected to the rocker 186 and its other end connected to the collar 188 to swing the rocker 186 downwardly. Each collar 187 and 188 is fixed with respect to the shaft 184 by a screw 191 which may be loosened to rock the associated collar 188 to adjust the tension of the associated spring, whereupon the screw 191 may be tightened.

The rocker 186 is provided at its free end with an upwardly extending portion 195, and between such portion and the body of the rocker 186 is formed a recess 196 opposite walls of which are slotted as at 197. These slots receive a transverse shaft 198 carrying a roller 199 formed of rubber or other resilient material. Above the extension 195 is secured a stop plate 200 projecting beyond the adjacent end of the recess 196 and engageable against the roller 199, in a manner to be described, to prevent rotation of such roller in one direction to feed toward the right, as viewed in Figure 4, the upper sheet 11 of the stack 10. The feeding position of the roller 199 is shown in Figure 12.

The rocker 186 is provided at one side thereof with an upstanding integral boss 204 against which is arranged the end of a spacing stud 205 at the outer end of which is arranged a roller 206. This roller and the stud 205 are fixed with respect to the rocker 186 by a screw 207 threaded in the boss 204, the roller 206 being rotatable on the screw 207 for a purpose to be described.

The rocker 185 is formed similar to the rocker 186 except that it is the reverse of the latter rocker. The rocker 185 is provided with a recess 210, opposite walls of which are slotted as at 211 to receive a shaft 212 carrying a rubber or similar roller 213. The rocker 185 is also provided with a projection 215 similar to the projection 195 and provided thereabove with a stop plate 216 fixed thereto. The plate 216 has its inner edge projecting slightly beyond the adjacent end of the recess 210 to engage the roller 213 and prevent rotation thereof in one direction. The rocker 185 also carries a roller 217 fixed with respect thereto in the same manner that the roller 206 is mounted relative to the rocker 186.

It will become apparent that the roller 213 is free to rotate clockwise but will be prevented from rotating counterclockwise by the plate 216. Conversely, the roller 199 is permitted to rotate freely in a counterclockwise direction but is prevented by the plate 200 from rotating clockwise. Therefore, the roller 199 in Figure 12 is locked against rotation to feed the sheet 11 toward the right to the conveyor tapes 55, while the roller 213 in Figure 14, being fixed against counterclockwise rotation, will remain stationary under such conditions and will buckle the upper sheet 11 of the pack to loosen it from the top of the pack, ready to be engaged by the roller 199 on the return rocking movement of the rocker 182.

To the right as viewed in Figures 11, 12 and 13 of the sheet-feeding mechanism just described is arranged a stationary cross shaft 220 (see Figure 4) suitably supported with respect to the sides of the main frame 20. At spaced points, the shaft 220 supports rocker arms 221, free to turn on the shaft 220 and each supporting at its free end a pinch roller 222 arranged above the knurled roller 56 to pinch thereagainst each successive sheet 11 as the advancing edge passes over the top of the knurled roller 56. This roller, being driven, will exert a pull on the advancing edge of each sheet 11, assisted by the weight of the pinch rollers 222, and this pull is transmitted to the roller 199 to swing the bottom thereof to the left and bodily move such roller out of engagement with the stop plate 200. This frees each sheet 11 for movement over the tapes 55.

Referring particularly to Figures 11, 12 and 13, the numeral 225 designates one of a pair of brackets having lower ends secured as at 226 to certain of the front guides 227 against which the forward edges of the bands of the stack 10 engage. Each bracket 225 extends around an annular groove 228 formed in the knurled roller 56 and has secured to the top thereof a plate 229. A hold-down finger 230 is pivoted as at 231 to the plate 229 and has its free thin edge overlying the top sheet of the stack 10 to act as hold-down means therefor. Each hold-down finger 230 is urged downwardly by a spring 232. It will be noted from a comparison of Figures 11 and 12 that the roller 213, in moving bodily to the left, slips the forward edge of the top sheet 11 from beneath the hold-down finger 230, thus freeing the forward edge of the sheet to move over the top of the finger 230 to the tapes 55, as further described below.

Each of the units comprising the rockers 185 and 186 is associated with a track 235, shown in detail in Figures 11, 12 and 13. The forward end of the track 235 lies in a slot 236 formed in a collar 237 carried by the shaft 220, the track being fixed to the collar 237 by a rivet 238. The forward end of each track is similarly secured to a collar 239 carried by the shaft 80. Intermediate its ends (Figures 11 and 12), each track 235 is provided with a horizontal section 242 rearwardly of which the track slopes upwardly relatively sharply at 243 to connect to a less sharply sloped portion 244 secured to the collar 239. Forwardly of the horizontal section 242, the track 235 slopes upwardly relatively sharply, as at 246, and then slopes less sharply forwardly as at 247 to form a track portion similar to the track section 244. The forward limit of movement of the roller 217 is shown in Figure 12, and beyond the track section 247, the track slopes upwardly at a smaller angle, as at 248, to provide an end fixed to the collar 237.

Means are provided for preventing each advancing sheet moving over the tapes 55 from fluttering or moving upwardly from the tapes. Referring to Figures 4, 11 and 12, the numeral 252 designates each of a plurality of collars fixed to the shaft 80. To each such collar is fixed one end of a spring wire 253 which extends downwardly and forwardly, beneath the shaft 179 and offset from the sheet-feeding units. The free end of the spring wire 253 extends above and in parallel relation to the upper runs of the tapes 55 throughout the length thereof.

As previously stated, movement to the left of the roller 213 (Figure 12) pulls the forward edge of the top sheet 11 of the stack from beneath the finger 230, and means are provided for preventing the rear edge of the top sheets of the pack from being moved out of place. A plurality of brackets 260 are carried by the shaft 80 and are provided with split upper ends 261 adapted to be clamped to the shaft 80 by screw devices 262, each associated with one of the brackets 260. Against the bottom of each bracket 260 is secured a rod 263 by means of screws 264 carried by the bracket 260. A head 265 is slidable on each rod 263 and is fixed in adjusted positions therealong by a set screw 266. Each head 265 carries an integral depending lug 267 to which is secured a depending finger 268. The finger 268 has its lower portions sloping rearwardly parallel to the guide bars 227, and the lower end of each finger 268 is curved rearwardly as at 269 to prevent its catching against the edges of any of the forwardly moving sheets of the stack. The lower end of each finger 268 is arranged in a slot 270 formed in the table 78.

The head 265 is adjustable forwardly and rearwardly according to the width of the bands in the stack 10. Side guides 275, adjustable as described below, position the bands of the stack transversely of the apparatus. These side guides are connected at their lower ends to heads 276 adjustable along a transverse shaft 277 fixed at its ends to the side frame members 20. The heads 276 are adjustable along the shaft 277 by loosening set screws 278, and the shaft 277 is graduated as at 279 to assist in positioning the side guides 275 in accordance with the length of the bands.

The upper ends of the side guides 275 are connected to the inner ends of transversely extending shafts 282 slidable in the side frame members and adapted to be clamped in adjusted positions by screws 283. The shafts 282 also are graduated as at 284.

Referring to Figures 10 and 17, the numeral 288 designates a plurality of spaced supporting cross bars fixed at their ends to the longitudinal frame members 30. These cross bars support centrally of the width of the machine a chain track 289. On opposite sides of this track are arranged longitudinally extending plates 290 the inner edges of which are supported by the track 289 and the outer edges of which are supported by the frame members 30, as clearly shown in Figure 10.

At the inlet end of the apparatus is arranged a driven shaft 294 journaled at its ends in the main frame 20. The shaft 294 carries a sprocket 295 around which passes a chain 296, and this chain, in turn, passes around a sprocket 297 carried by the drive shaft 40. Accordingly, the shaft 294 will be driven whenever the clutch 44 is engaged. The shaft 294, centrally of the width of the apparatus, carries a sprocket 298 (Figures 10 and 17), and a chain 299 passes around this sprocket. The runs of the chain 299 are horizontal, and the opposite end of this chain passes around a sprocket 304 mounted on a shaft 305 journaled in the frame 21. Certain links of the chain 299 carry transverse plates 306 to support packs of fillers fed to the apparatus in a manner to be described.

Certain of the plates 306 are provided therethrough, adjacent the following edge thereof in the top run of the chain 299, with slidable stems 308 having relatively flat heads 309. The top face of each such plate 306 is recessed downwardly, as at 310, to permit the heads 309 to move downwardly with their edges below the top of a band 11 as shown in Figure 17, for a purpose to be described. Each stem 308 is connected to one end of a biasing spring 312, the opposite end of which is connected to the opposite edge of the associated plate 306 for a purpose which will become apparent. As shown in Figure 10, the heads 309 are arranged in opposite pairs, one on each side of the longitudinal center of certain of the plates 306 provided with the vertically movable pins.

At each side of the sprocket 298, a bracket 315 is secured against the bottom of the adjacent end of the plate 289 and is provided with an arcuate portion 316 overlying the shaft 294. Above the plate 289 and secured to such plate is a bar 317 in the vertical plane of the associated bracket 315. A steel cam strip 318 is fixed against the upper and outer surface of the curved extension 316 and extends over the top of the bracket 315 and over and along the top of the bar 317. The member 318 forms a cam engageable with the lower or inner end of each stem 308 to move the latter upwardly to lift the heads 309 substantially above the plates 306, as shown by the left-hand stem 308 in the upper run of the chain 309 in Figure 17. The entering end of the cam track 318 is arranged close enough to the axis of the shaft 294 to clear the end of each approaching stem 308, and as each stem passes around the curved portion of the cam element 318 is will be lifted, as will be apparent. It also will be obvious that as each stem 308 passes beyond the right-hand extremity of the cam element 318, such pin will drop downwardly under the influence of its biasing spring 312. When this occurs, one of the sheets or bands 11 will be positioned just ahead of a pair of the pins 308 carried by one of the plates 306.

Means are provided for accurately positioning each successive band 11 transversely of the chain 299. Referring to Figure 10, the numeral 322 designates a pair of sprockets carried by the shaft 294, and around each of these sprockets passes a chain 232. The upper runs of the chains 323 are arranged just below the plates 290, and certain side links of the chains 232 have projections 324 operating in slots 325 in the plates 290. the projections 324 of the two chains 323 are arranged in alinement transversely of the apparatus and very slightly ahead of a corresponding pair of pins 308. The forward ends of the chains 323 pass around sprockets 326 shown in Figure 4A and supported for rotation on a shaft 327 mounted in bearings of any suitable type. The projections 324 operate as positioning elements, being engageable with the following edges of successive bands 11 to square them transversely of the machine prior to the gripping of the following edges of the bands by the heads 309.

Also mounted on the shaft 294 is a pair of sprockets 330 having split hub portions 331 adapted to be clamped by bolts 332 in circumferentially adjusted positions with respect to the shaft 294. This adjustment of the sprockets 330 is important for a reason to be described below. The sprockets 330 drive chains 336 arranged on opposite sides of the line of plates 306 as shown in Figure 4. At spaced points therealong, each chain 336 carries an outstanding positioning lug 337. These lugs are arranged in opposite pairs, as shown in Figure 4, to position a filler pack to be wrapped with respect to the band to be placed therearound.

Each successive band is fed by the tapes 55 to the right as viewed in Figures 2 and 4, to the plates 306. Each such band is squared by the lugs 337 and gripped by the buttons 309. As each band is fed outwardly to the plates 306, they will be stopped in their movement until the squaring and gripping means catches up with the following edge of the band.

Referring to Figures 2–5, inclusive, the numeral 340 designates a plate fixed against the outer face of each side frame member 30 and projecting substantially thereabove. A shaft 341 extends between the plates 340 and is supported thereby. On opposite sides of the center of the apparatus are arranged parallel rods 342 having free ends projecting toward the entrance end of the apparatus. The other ends of these rods are bent back upon themselves in a loop 343 and terminate in ends 344 projecting through the rod 341 to be supported thereby. It will be noted that the rod ends 344 are higher and closer together than the free ends of the main portion of the rod 342, and the purpose of this is to provide clearance for parts to be described. The free end of each rod 342 carries an adjustably slidable head 348, and these heads may be mounted in adjusted positions along the rods 342. Each head 348 projects laterally outwardly of the rod 342 and supports a spring wire 349. Such wire is slidable through the head 348 and may be clamped in adjusted positions by a set screw 354. Obviously, each head 348 is similarly adjustable along its rod 342.

Referring to Figure 3, it will be noted that each spring wire 349 slopes downwardly and forwardly and terminates in a looped end 355 adapted to rest upon the plate 290 and thus serves to arrest each incoming band by contact with the leading edge thereof, while permitting such band to be pushed beneath the loop 355 by operation of the lugs 337 and heads 309.

The mechanism described above provides for the feeding of successive bands 11 from the top of the stack through the apparatus, the band feeding being accomplished by the rocking of the shaft 170 and arms 173. If desired, without stopping the motor in other parts of the apparatus, the functioning of the machine can be stopped by rendering the feeding mechanism inoperative. For this purpose, the shaft 170 (Figure 7) carries a finger 360 engageable against the upper end of a stop arm 361 carried by a shaft 362 supported by one of the frame members 20. The arm 361 is normally arranged in the position shown in Figure 7 and is adapted to be swung to the right to engage the finger 360 by operation of a rod 363 connected to an operating lever 364 (Figure 3). When the arm 361 is arranged beneath the pin 360, the arms 173 will be supported in the solid-line position shown in Figure 7 and cannot be swung to the left of this position by the springs 177 when the roller 172 (Figure 6) passes from the high portion of the cam 111.

A pair of collars 368 are carried by the shaft 341. Each of the collars 368 supports one end of a bar 369, and inwardly of each such bar is arranged a guide plate 370 secured to the associated bar. These guide plates are adjustable along the shaft 341 in accordance with the dimension of a pack of sheets or filler transversely of the apparatus. It is between these guides that the packs of sheets are placed on the conveyor chain plates 306. These packs ordinarily are fed by hand by an operator and are placed in position between the guides 370 approximately in the zone indicated by the numeral 371 in Figure 3, which zone may be considered the loading station.

Whereas the packs are positioned transversely of the apparatus by the guides 370, the bands fed from the tapes 55 are also preferably positioned transversely of the apparatus by guides 372 in the form of angle irons. Each guide 372 carries an outstanding bracket arm 373 seating on the associated plate 290 and slotted to receive a screw 374 adapted to be threaded into selected openings 374' in the associated plate 290. The openings 374' permit wide variation in the adjustment of the guides 372 toward and away from each other, while the slotted arms 373 permit finer adjustment within reasonable limits. Moreover, the screws 374 permit adjustment of the guides 372 whereby these guides converge away from the tapes 55 to insure against engagement of the forwardly moving bands with the ends of the guides 372.

The bands 11 obviously are of greater dimension transversely of the apparatus than the packs placed between the guides 370, and accordingly the bands must pass beneath such guides. For the purpose of providing clearance between the lower edges of the guides 370 and the plates 290, each collar 368 is provided with an upstanding finger 375 through which passes an adjusting screw 376 engageable with a shaft 377 supported by the side plates 340. This construction is clearly shown in Figure 9.

Plates 290 are provided with transverse openings 385 and 386, the former of which provides access of the bands passing thereover to printing mechanism arranged beneath the associated plate 290. The printing mechanism forms no part of the present invention. A roller 387 supported by an arm 388 presses the bands passing thereunder into contact with the printing mechanism to insure the proper printing of the band.

The opening 386 provides access of each passing band to a glue-applying roller 390 (Figure 3) provided with suitable wiping and adjusting means 391. The glue-applying means forms no part per se of the present invention. The bar 369 adjacent the opening 386 carries an outstanding rod 392 to which is connected the free end of an arm 393 carrying a roller 394 for pressing the passing band against the glue roll to insure the application of glue to the under side of each band adjacent one end thereof. The openings 385 and 386 are elongated transversely of the apparatus to take care of bands of substantially varying lengths, and the portions of these openings which are unnecessary for a band of any given size are covered by plates 395 suitably slidably mounted relative to the openings 385 and 386. These plates may be of any desired type and form per se no part of the present invention.

As previously stated, the guides 370 are adjusted apart a distance equal to the length of the filler pack to be placed therebetween, and these guides have clearance with the table top for the passage thereunder of the end portions of each band 11. At the free end of each guide 370 is arranged a supporting bracket 400. Each of these brackets has one end lying outwardly of the associated guide 370 and slotted as at 401 to receive screws 402 for clamping the bracket 400 in position. The end of each bracket beyond the adjacent end of the associated guide 370 is offset inwardly as shown in Figure 4 and supports a hold-down bar 403 the adjacent end of which overlaps and lies inwardly of the associated guide 370. Each bracket 400 is provided with screws 404 tapped thereinto and passing through slots 405 in the hold-down members 403. The screws 404 are tightened to adjust the height of the hold-down members 403, the lower edge of these members being arranged above the plates 290 a distance equal to the thickness of the filler packs passing thereunder. Referring to Figure 4, it will be clear that since the edges of the pack contact with the guides 370, the adjacent edge portions of the pack must pass beneath the hold-down members 403.

Each successive band with a filler pack placed therein at the loading station passes on to folding mechanism which wraps the ends of the band around the pack and applies pressure to one end of the band to cause it to adhere to the glued other end of the band. Such mechanism is shown in Figures 18–24, inclusive. Referring to these figures, the numerals 410 and 411 designate a pair of opposite parallel folding bars. These bars are shown in end elevation in Figure 20 and in section in Figure 21. Outwardly of each of the folding bars is arranged a pair of brackets 412 connected to rods 413 extending toward the edges of the table top and fixed in adjusted positions by clamps 414. The screws of the clamps 414 may be loosened to adjust the folding bars 410 and 411 toward each other in accordance with the size of the pack passing through the apparatus. Each bracket 412 (Figure 20) is provided with an upper arm 418 overlying the adjacent folding bar and forming a seat for the lower end of a spring 419. A stem 420 extends through each spring and freely through an opening in the associated arm 418, and the lower end of each stem 420 is fixed to the associated folding bar. A nut 421 is threaded on each stem 420 and may be turned to adjust the compression of the associated spring 419, thus spring-suspending the folding bars above the plates 290.

Fixed to the bracket 412 of the folding bar 410 is a side guide 424, and a similar side guide 425 is fixed to the bracket 412 adjacent the folding bar 411. The openings in the arms 418 through which the stems 420 extend are provided with definite clearance around the stems to insure against any possible binding action so that the folding bars 410 and 411 are free to float vertically. To prevent any inward swinging of the folding bars, each of the side guides 424 and 425 is slotted as at 426 (Figure 21) to receive the shank of a pin 427 threaded into the associated folding bar. The head of each pin 427 lightly engages the outer face of the associated side guide bar without any binding action so as to preserve the free vertical characteristic of the folding bars.

Each of the folding bars is further provided with a screw stem 430 (Figure 18) passing through the upper arm 418 of the associated bracket and provided with a nut 431 engageable with the upper face of the associated arm 418 to limit downward movement of the folding bars. Thus these bars are supported positively at an adjusted distance above the plates 290 approximately equal to the thickness of the packs being banded, but most of the weight of the folding bars is supported by the springs 419 so that very little force is required for an entering pack to pass beneath the folding bars.

Referring to Figure 19, it will be noted that the folding bar 411 projects toward the entering end of the apparatus to a slightly greater extent than the folding bar 410. The purpose of this, as will become more apparent below, is to insure the initial folding of the end of the band to which glue has been applied. To initiate the folding operation, the guide bars 424 and 425 at the entrance end thereof are provided respectively with tapered end plates 434 and 435 which diverge toward the entrance end of the apparatus and taper to zero thickness to insure the passage over the plates 434 and 435 of the ends of the bands lying outwardly of the filler pack. The plates 434 and 435 thus slide beneath the projecting ends of the band to lift them upwardly and swing them inwardly as indicated by the numeral 436 in Figure 20, and the entering ends of the folding bars 410 and 411 are undercut and curved as in Figure 20 to facilitate the progressive folding down of the band ends. Beyond such ends thereof, the folding bars are merely curved as at 437 through a portion of the rest of the length thereof, the outer or lower extremity of this curve in each case being horizontal to insure the folding of the band ends flat on the pack. One of the packs 12 has been shown in Figure 20, being moved beneath the folding bars by the chain lugs 337.

In the cutting of the filler packs, some inaccuracies occur, the lengths of the packs varying as much as 1/8 inch. With slightly shorter packs, therefore, there would be some clearance between the guide bars 424 and 425 which would interfere with the proper folding of the band around the pack. To compensate for such variations in pack dimensions, the device shown in Figures 22, 23 and 24 is employed. The guide bar 424 is cut away as at 440 to receive a floating plate 441 having a projecting end 442 shaped generally similar to the extension 434 and mounted in a cut-away 443 in such plate. The projecting end 442, as shown in Figure 23, diverges toward the inlet end of the apparatus and preferably at a slightly greater angle than that of the projection 434, for a purpose which will become apparent. For normal and properly sized packs, the inner face of the plate 441 will be flush with the inner face of the guide bar 428. When slightly smaller packs pass through the apparatus, the plate 441 moves inwardly to a slight extent to remain in contact with the adjacent edge of the pack, and to accommodate such movement, the outer face of the folding bar 410 is recessed as at 444 (Figure 20).

Referring to Figures 22, 23 and 24, a pair of brackets 448 are fixed against the outer face of the guide bar 424 in spaced relation to each other. Each of these brackets is provided with a tubular extension 449 extending toward the side of the apparatus and threaded at its outer end to receive an adjusting nut 450. A plate 451 surrounds the sleeve 449 and is slidable thereon. This plate is normally engaged with the outer face of the bracket 448 and is urged to such position by a spring 454 surrounding the sleeve 449. This spring engages at one end with the plate 451 and at its opposite end with the nut 450, as clearly shown in Figures 23 and 24.

The plate 451 is provided with three circumferentially spaced pins 455, and the bracket 448 and guide bar 424 are apertured as at 456 for projection of the pins 455 entirely through the guide bar 424. The pins 455 of each plate 451 directly engage the floating plate 441, and it will be obvious, therefore, that the springs 454 urge the floating plate 441 horizontally toward the pack to engage the latter. The plate 441 is provided with a pair of stems 458 projecting through the sleeves 449 and having threaded on their ends stop nuts 459 adjusted along the stems 458 to engage the respective sleeves 449 to limit inward movement of the floating plate 441. It will become apparent that the adjacent edge of each incoming pack will engage the projecting end 442 of the plate 441 and move it outwardly against the tension of the springs 454 to whatever extent is necessary for the passage of the stack between the guide bars 424 and 425 and beneath the folding bars.

Where narrow bands are employed, the folding bar 411, projecting slightly in advance of the folding bar 410, will fold over the glued end of the band in advance of the other end. Where wider bands are employed, it is desirable to employ means to retard the folding of the unglued end of the band so as to assure the folding of the glued end entirely over the pack before the opposite end is allowed to fold. For this purpose, a bracket 465 (Figure 5) is fixed to the guide 370 and carries an upstanding boss 466 through which projects one end 467 of a spring wire. This wire is looped over the members 370 and 403, as at 468, and has a long end 469 extending toward the outlet end of the apparatus to engage and support the unglued end of the bar, for example as shown in Figure 21. By the time the unglued end of the band has passed beyond the end of the member 469, the glued end of the band will have been folded over the top of the pack.

Upon the completion of the folding of the two band ends, it is desired to apply pressure to the top or unglued end of the band to cause it to adhere to the glued end. For this purpose, a shaft 472 extends across the apparatus and is supported relative to the plates 290, as at 473, and carries an arm 474 the end of which supports a roller 475. This roller bears upon the upper unglued end of the band to press it against the glued end as the banded pack passes beneath the roller 475, thus causing the two ends of the pack to adhere together.

It will become apparent that each band advancing through the folding mechanism will have its rear edge clamped beneath two of the buttons 309. Due to a drag of the pack and band on the plates 290 when passing through the folding mechanism, it occasionally occurs that the advancing edge of the band will be pushed rearwardly and buckled. To eliminate this, two conveyor belts 478 (Figures 1 and 21) are arranged on opposite sides of the center of the apparatus and pass around pulleys 479 and 480 mounted respectively on shafts 481 and 482 journaled in bearings 483. The top runs of the belts 478 operate through slots 485 formed in the plates 290, and the top runs of the belts are arranged very slightly above the level of the plates 290, for example 1/16", to support the outer portions of wider packs passing through the apparatus, thus eliminating any dragging of the band or pack on the upper surfaces of the plates 290. In the positions of the parts in Figures 20 and 21, the folding bars 410 and 411 have been adjusted for relatively narrow packs. However, these elements may be adjusted outwardly for wider packs (see Figure 19), and it is for such packs that the belts 478 are most important. Throughout the length of the upper runs of the belts 478, the guide plates 424 and 425 are cut away as at 487 to provide clearance for the outward adjustment of guide bars 424 and 425 and the elements carried thereby. The belts may be wider to extend further inwardly than shown in Figure 21, if it is desired to support out of frictional engagement with the plates 290 the outer edges of a pack such as that shown in Figure 21.

The shaft 481 is provided with a sprocket 490 around which passes a chain 491 (Figure 1), and this chain passes around a sprocket 492 carried by the drive shaft 40.

Adjacent the outer end of the apparatus (Figure 26), the track 289 is provided with an opening 496 through which projects an end 497 of a spring steel cam element 498, the end 497 being secured as at 499 to the track 289. The body of the cam member 498 is slightly spaced above the track 289 by a spacer 500 fixed to the track 289. The cam element 498 is secured to the track 289 solely by the screws 499 to eliminate breaking the continuity of the main portion 498 of the cam element. This cam element, adjacent the outlet end of the apparatus, engages the bottoms of the stems 308 to raise the buttons 309 a sufficient distance to release them from engagement with the bands.

Adjacent the outlet end of the apparatus and in a vertical plane beyond the end of the conveyor chain 299, a transverse shaft 504 is supported in suitable bearings and carries a sprocket 505 driven through a chain 506 from any suitable source of power such as a motor 507. The shaft 504, on opposite sides of the chain 299, carries a pair of pulleys 510 around which pass V-belts 511 the opposite ends of which pass around pulleys 512 suitably supported on a transverse shaft 513. Intermediate the pulleys 510, the shaft 504 carries a roller 514 having rubber or similar friction rings 515.

The roller 514 is arranged directly beneath a similar roller 516 carried by an arm 517 supported by a shaft 518. The upper runs of the V-belts 511 slope upwardly slightly toward the outlet end of the apparatus to lift the packs from the plates 306, and these belts are driven at a slightly greater linear speed than the chain 299 whereby, when the cam element 498 releases the buttons 309 from successive belts, the belts 511 and rollers 514 and 516 will pull the packs from the buttons, and this occurs prior to the turning of the plates 306 around the sprocket 304, and accordingly the raised buttons 309 are free to turn at the outlet end of the apparatus without tearing the previously gripped band.

From the outlet end of the apparatus, the banded packs are discharged into a suitable box 522. This box forms no part of the invention, and any suitable collection means may be provided for receiving the banded packs.

The apparatus as described works perfectly in conjunction with bands 11 having the grain of the paper running transversely thereof. Where the grain runs longitudinally of the band, however, difficulty may be encountered in folding the ends of the band around the pack. To overcome this difficulty, a creasing device is employed for breaking the grain of the paper along the lines at which the folds must occur at the top and bottom of the pack.

Referring to Figures 19 and 25, the numeral 525 designates a supporting shaft carrying a collar 526 having ears 527 through which are threaded adjusting screws 528. These screws are engageable with a lug 529 carried by a rocking collar 530 mounted on the shaft 525, the screws 528 limiting rocking movement of the collar 530. This collar carries an arm 531 from which projects longitudinally of the machine an arm 532 carrying a stud 533 (Figure 25). This stud has an axially projecting portion surrounded by suitable bearing means 534, surrounded in turn by a collar 535 having a circular outstanding flange forming a creasing blade 536. The sleeve 535 is externally threaded to be received in the hub 538 of a second annular creasing blade 539 maintained in position by a lock nut 540. The assembly shown in Figure 25 is bodily adjustable laterally of the apparatus by adjusting the shaft 525 (Figure 19) in a suitable support 542 having a lock screw 543 for securing the shaft 525 in adjusted positions. This adjustment is utilized for properly positioning the creasing blade 536 to press upon the band and score it in exact alinement with the outer bottom limit of the pack of sheets to be banded. According to the thickness of the pack, the creaser 539 may be adjusted on the sleeve 535.

In place of the sheet-feeding mechanism shown in Figures 11–14, inclusive, a conventional push roller feed with needle hold-down may be employed, as shown in Figures 15 and 16. Referring to Figures 15 and 16, the numeral 546 designates a bracket slidable on each of two of the rods 263 and secured in adjusted positions by set screws 547. Each bracket 546 carries a lug 548 having a pivot pin 549 supporting an arm 550 through the end of which projects a hold-down needle 551 engaging the top of the stack 10. A pin 552 engages a shoulder 553 forming a part of the arm 550 to limit downward movement of the arm 550. A torsion spring 555, functioning in the same manner as the springs 189 and 190, referred to above, may be adjusted to hold the pins 551 in engagement with the top of the stack 10 in accordance with the type of paper from which the bands are made.

The means for feeding the successive sheets from the pack to the tapes 55 is carried by the shaft 179 and is operated in the same manner as the mechanism shown in Figure 14, except that the arm 185, roller 213, and associated elements are eliminated. In other words, this device in Figures 15 and 16 includes an arm 556 which is substantially identical with the arm 186 and associated elements, except that it is unnecessary to employ the track 235 to lift out of engagement with the top band of the stack the rubber roller 557 corresponding to the roller 199. The roller 557 is carried by a shaft 558 mounted in a slot 559, and the roller is prevented from rotating in a counterclockwise direction by a stop plate 560. It will be apparent that when the shaft 179 rocks clockwise, the roller 557 will roll across the top sheet of the stack. When the rocking movement of the shaft 179 is reversed, the roller 577 will be locked against rotation and will pull the top sheet from the stack to feed it to the tapes 55. The needles 551 tear through the top band and hold in position the next adjacent band to prevent its being moved with the top band.

*Operation*

A stack of bands is placed in position on the table 78 with the latter, of course, in the lower position. Any printing on the band should be on the bottom thereof so as to be placed on the outside of the resultant banded filler pack as will become apparent. The stack of bands is properly centered relative to the machine and their forward edges are arranged in contact with the guide bars 227 with the backstop 554 adjusted into engagement with the back edge of the stack, as shown in Figure 15, by adjusting the bracket 546. The side guides 275 (Figure 8) are brought into engagement with the ends of the stack. The stack is centered relative to the machine and the side guides 275 must be perfectly vertical, the graduations 279 and 284 providing for such accurate adjustment of the side bars. The hand wheel 104 is then rotated to turn the ratchet wheel 143 in a counterclockwise direction as viewed in Figure 7. The teeth of this wheel escape under the pawl 141 and the worms 101 will rotate the shafts 86 (Figure 8) to lift the plate 78 to a position where the top band is level with the top of the knurled roller 56. The apparatus is now ready to start operating, and during such operation, the side guides 275 will fit sufficiently tightly against the ends of the bands 11 to prevent them from shifting endwise, that is, transversely of the apparatus, while the front guides 227 and backstop 554 fix the bands properly in position transversely of their widths.

Referring to Figure 7, the pawl 141 is swung out of engagement with the ratchet teeth 142. Assuming the motor 25 (Figure 1) to be running, the lever 52 is operated to engage the clutch 44 (Figure 10). This operation causes the chain 34 to drive the shaft 32, and the pinion 43 meshing with gear 42, drives the shaft 40. Thus the shaft 294 will be driven and will rotate in a clockwise direction as viewed in Figure 9, whereby the upper run of the chain 299 moves to the right. The chain 71 (Figures 9 and 10), driven from the shaft 40, will rotate the knurled roller 56, thus operating the tapes 55 as a conveying means to move the bands in a manner to be described from the top of the stack 10 to the plates 306 of the conveying chain 299. The chains 336 and 323 will be similarly driven from the shaft 294. The shaft 109 (Figure 5) also will be driven from the shaft 40 by means of the chain 107, thus rotating the cams 110 and 111 (Figure 6). The cam 111 rocks the arms 171 and 173 back and forth about the axis of the shaft 170, and the rocking of the arms 173 feeds the bands in a manner to be described.

The cam 110 engages the roller 116 which follows around the semicircular portion of the cam 110 and can drop toward the low point of the cam only as such action is permitted by downward movement of the roller 125 as the level of the top of the stack 10 drops. With the pawl 141 released from the ratchet teeth 142, the knurled screw head 152 (Figure 7) is adjusted until the shoulder 136 swings beneath the finger 145. The pawl 141 is then re-engaged with the ratchet teeth 142.

The spring 122 (Figure 6) tends to swing the arm 117 in a clockwise direction, thus tending to cause the roller 116 to remain in engagement with the cam 110. Looking at the opposite side of the machine, this spring tendency urges the arm 129 toward the right to impart similar movement to the rod 130, which action is prevented so long as the top of the stack is at the proper point, since the roller 116 cannot swing inwardly from the concentric portion of the cam 110 when the latter passes beneath the roller 116. The stop collar 135 (Figure 7) is so adjusted that when the arm 129 does swing to the right incident to a lowering of the top level of the stack, it will move the arm 131 to the right in Figure 7 to release the shoulder 136 from the finger 145. The arm 140 then will be rocked clockwise by the spring 165 to permit the pawl to escape over a tooth of the ratchet wheel 143.

Referring to Figure 7, it will be noted that the shaft 109 which carries the cams referred to also carries an eccentric 160 which effects a short reciprocation of the rod 162 at each revolution of the shaft 109. The slotted head 163 carried by the rod 162 slides back and forth on the pin 164 without transmitting any movement thereto except when the pawl 141 has escaped over a tooth of the ratchet wheel to permit the pin 164 to move to the left in Figure 7. Subsequent movement of the rod 162 to the right then rocks the arm 140 and effects an advancing of the ratchet wheel 143 to turn the shaft 102. This action (Figure 6) rotates shafts 86 through worms 101 and worm wheels 100, thus causing the chains 89 to lift the plate or table 78, thus elevating the stack of bands. The mechanism thus described always maintains the top sheet 11 of the stack 10 in a position to be moved from the top of the stack to be fed to the tapes 55.

As previously stated, the arms 171 and 173 rock on the shaft 170 during rotation of the cam 111. This operation rocks about the axis of the shaft 170, the short shaft sections 175 thus transmitting similar movement to the cross shaft 179. Rocking of the latter shaft carries the head 182 back and forth between the positions shown in Figures 11 and 12. As the head 182 swings to the left, the rollers 206 ride up the inclined track way portions 243, thus lifting the rollers 199 (Figure 14) of the feed mechanism from the top sheet 11 of the stack on the table 78. At the same time, the rollers 217 roll down the inclined track way 246, thus releasing the rollers 213 for engagement with the top band 11. The rollers 213 thus tend to revolve counterclockwise (Figure 14) and this causes the rollers 213 of each of the feeding units to engage the associated plates 216 to be locked against rotation. The rollers 213 thus move the forward or right-hand edge of the top band from beneath the hold-down fingers 230, which are maintained in engagement with the forward edge of the stack by the spring 232.

The forward edge of the top band 11 having been released from the hold-down fingers 230, the shaft 179 will start to rock counterclockwise, and the rollers 213 will be released from the plates 216 to rotate clockwise, whereupon the rollers 217 (Figure 12) move from the horizontal track sections 242 to the inclined sections 246, which operation lifts the rollers 213 from the top sheet of the stack. The top band preferably having been buckled in the operation described as shown in Figure 14, it then slides over the knife edges of the hold-down fingers 230.

Counterclockwise rocking of the shaft 179 permits the rollers 206 to roll down the inclined track way 243, whereupon the rollers 199 engage the top band and, bearing on the top of the stack, will be removed rearwardly in the slot 197 and rotation of the rollers 199 will be prevented by the plates 200. Anti-friction engagement of the rollers 199 with the top band causes such band to be moved to the right to slide over the top of the hold-down fingers 230.

The top band of the stack thus will have its forward edge fed over the hold-down fingers 230 and over the knurled roller 56. The advancing edge of the sheet will pass beneath the rollers 222 which maintain the sheet in firm contact with at least some of the tapes 55 to insure the passing of the band 11 thereover. Thus each successive band will be fed over the tapes 55.

From the right-hand ends of the tapes as viewed in Figures 2 and 4 (the left-hand end as viewed in Figure 5)

each successive band will be discharged onto the conveyor chain plates 306, and movement of each band thus discharged to the conveyor chain plates will be arrested in its movement by the spring fingers 349. The following edge of each band thus placed on the plates 306 will be picked up by the chain lugs 324. These lugs of the two chains with which they are associated are alined transversely of the apparatus a very small fraction of an inch in advance of the transversely alined shanks of the pins 308 (Figure 4A). In this connection, it will be noted that as the chain 299 passes around the sprockets 298, the inner ends of the pins 308 will contact with the cam track way portion 318 to be elevated at the beginning of the upper runs of the conveyor chains 299. At the beginning of the latter runs, therefore, the buttons 309 will be elevated as shown in Figure 17 and the operation of the chain lugs 324 squares each successive band transversely of the apparatus with the following edge of each band beneath two of the buttons 309 of one of the plates 306. The band thus will be carried along toward the right as viewed in Figure 17 until the end of the button-elevating cam is reached, whereupon the spring 312 of each button stem 308 will snap the associated button 309 downwardly into engagement with the following edge of the band. The recesses 310 receive the buttons when the latter move downwardly, these buttons cooperating with the edges of the recesses to positively grip the bands. The recesses are slightly larger than the buttons to permit the slight downward offsetting of the portions of the bands beneath the buttons without damaging the bands. One of the buttons in operative position holding one of the bands is shown at the right-hand side of Figure 17.

Approximately at the loading zone indicated by the numeral 371 in Figure 3, an operator will place a filler pack in position between the side guides 370 (Figure 4). The filler pack thus positioned will be picked up by two of the lugs 337 associated with the chains 336, and when a pair of the lugs 337 engages the rear edge of the filler pack, the band, clamped by the buttons 309, will be centered relative to the filler pack. This centering is accomplished by relative adjustment of the chains 299 and 336 by loosening the bolts 332 (Figure 10) and manually operating the chains 336 with the apparatus standing idle. This operation is permitted since the sprockets for the chains 336 at the outlet end of the apparatus may turn freely on the shaft 305.

The chains 323 are relatively short and the lugs 324 of these chains may go out of operation as soon as each band is clamped by the buttons 309. Thus the lugs 324 move through the slots 325 (Figure 4A) until the button-clamping operation has been completed, whereupon the chains carrying the lugs 324 pass around the sprockets 326.

As previously stated, a filler pack is placed between the side guides 370 and the ends of each band will be positioned transversely of the apparatus by the side guides 372 (Figure 4). These bands, being of greater dimension transversely of the apparatus than the filler pack, must extend beneath the side guides 370 for the filler pack. Clearance of the side guides 370 relative to the top plates 290 is maintained by adjustment of the screws 376 (Figure 3) which bear on the shaft 377 to exert a force against the arms 375 to properly support the side guides 370. The side guides 372 for the bands are fixed to the top plates 290 solely by the screws 374, and the guides 372 preferably are clamped in position with a slight divergence therebetween toward the tapes 55 to insure the proper positioning of the bands transversely of the apparatus before the bands are clamped by the buttons 309. The screws 374 may be tightened in any adjusted positions in the slots of the brackets 373 and are adapted to be threaded in any of the openings 374', thus providing substantial adjustment of the guides 372 transversely of the apparatus.

Each filler pack dropped in position as described is carried along by the chain lugs 337, and obviously the sheets of the pack are loose, being engaged solely by the lugs 337. To prevent any displacement of the sheets of the filler pack, for example, the lifting of the sheets due to air passing therebeneath, the pack runs beneath the side members 403, the left-hand ends of which, as viewed in Figure 3, are carried by the screws 404. These screws obviously having their heads inwardly of the rails 403, are adjustable to position the rails or bars 403 with proper clearance therebeneath for movement of the filler pack therebeneath.

As the band progresses through the apparatus, the upper end thereof as viewed in Figure 4 passes beneath the roller 387 associated with printing mechanism thereebeneath to print any desired data, such as a trade-mark, the filler size, etc. on the band. The printing machine forms per se no part of the present invention. The lower end of the band as viewed in Figure 4 passes beneath the roller 394 and the glue-applying roller 390 (Figure 3) thus applies a line of glue along the lower face of the band. Any suitable type of glue-applying mechanism may be employed, and such mechanism per se forms no part of the present invention.

The folding mechanism for turning the ends of the band over the top of the filler pack operates perfectly in itself where the grain of the paper runs transversely of the band, that is, longitudinally of the apparatus. Some bands, however, have the grain thereof running lengthwise of the band, and the folding mechanism may not perfectly in all cases effect a sharp bending of the band to fold it around the filler pack. Accordingly, the creasing mechanism shown in Figures 19 and 25 is employed. The arms 531 are adjusted along the rods 525 so that the creasers 536 will lie against the edges of the filler pack passing through the apparatus. The sharp edges of the creasers 536, bearing on the band will break the grain structure of each band along the proper lines for the bending of the band upwardly over the bottom edges of the filler pack. The creasers 539 will be adjusted along the hubs 535 so as to be spaced from the adjacent creasers 536 a distance equal to the thickness of the filler packs to be banded. Accordingly, the creasers 539 will break the grain structure of the bands along the proper lines for the bending of the bands along the top opposite edges of the filler pack.

Just prior to the passage of the entering edge of the band beneath the creasers, such edges will pass over the forward edges of the tapered plates 434 and 435 to be lifted thereby, this constituting the first step in the folding operation. The folding bars 411 at the bottom of the apparatus as viewed in Figure 2 have their left-hand ends extending further to the left than the upper folding bar. The reason for this is that the glued end of the band should be first picked up and turned upwardly by the folders whereby such end of the band can have its fold completed so as to lie upon the top of the filler pack with the glued end thereof facing upwardly prior to the folding over of the other end of the band. To insure the retarding of the folding over of the unglued end of the band, the wire spring 469 is employed. This means is unnecessary for narrower bands, but is important for use with wide bands to insure the proper folding of the glued end of the band definitely ahead of the folding of the unglued end.

As each filler pack and its band enter the space between the folders, the curved ends of the folders 410 and 411 (Figure 20) will engage the upwardly extending ends of the band and start to swing them inwardly. The folding bars float lightly over the filler pack by virtue of the use of the springs 419, and as the bands move away from the observer in Figure 20, portions of the folding bars beyond the curved entering ends thereof will tend to fold the ends of the band downwardly. The glued end of the band, passing beneath the bar 411 will be folded directly downwardly without interference over the top of the pack as shown in Figure 21. The other end 436 of the band will engage the spring wire 469 to be supported in position until the complete folding down of the glued end of the band. Then, passing from the free end of the wire 469, the unglued end of the band will swing downwardly over the top of the pack for the completion of the banding operation. The thus assembled parts of the banded pack will then pass beneath the roller 475 (Figure 2) which exerts pressure on the top end of the band to effect the adhesion thereof to the glued end of the band. The banded filler pack is now completely assembled and is ready to be discharged from the apparatus.

As previously stated, the filler packs, in accordance with the method of cutting them, are not always true as to size in the dimension thereof transversely of the apparatus. Therefore, a filler pack, even very slightly shorter than the intended size, will tend to pass through the apparatus without the band being placed tightly therearound. It is for this reason that the transversely floating plates 441 are employed at one side of the apparatus. If a pack slightly below the intended dimension passes through the folders, the springs 454 urge the pins 455 inwardly to insure contact of the plate 441 with the band passing around the adjacent edge of the pack to insure the tight placing of the band.

After the pack with the band applied therearound passes beyond the roller 475, the chain 299 will pass around its sprocket 304, spaced from the outlet end of the apparatus. As the chain referred to approaches such sprocket, the shanks 308 (Figure 27) will pass over the cam strip 498, and this raises the buttons 309 sufficiently to release them from the bands which they have gripped throughout most of the movement of the bands through the apparatus. Each pack is thus freed for removal from the apparatus.

After the buttons 309 are thus released from the band of each pack, the latter passes onto the belts 511 (Figure 26) and these belts slope slightly upwardly toward the discharge end of the apparatus. Moreover, the linear speed of these belts exceeds the linear speed of the plates 306 of the chain 299. Therefore, after the releasing of the buttons 309, the pack is picked up by the belts 511 and moved at an increased speed to pull the following edges of the bands out from under the buttons 309. Thus these buttons are free to swing around the axis of the sprocket 304 without moving downwardly over the bottom portion of the band, and the tearing of the band is thus prevented. The finished and discharged banded packs are collected in the box 522, or any other suitable collecting means.

While it is important from a practical standpoint to provide means for automatically and successively feeding bands to the apparatus, the operation of the apparatus is not dependent upon the specific form of band-feeding means shown in Figures 11 to 14, inclusive. Instead of employing the rocker arms 185 and 186 (Figure 14) and associated elements, the mechanism shown in Figures 15 and 16 may be employed. The arm 556 of each sheet feeding unit, of which two preferably are employed, corresponds to one of the arms 186. The shaft 179 is rocked in the manner previously described. When the rocker 188 in Figure 15 moves to the left, the roller 557 is free to roll across the top band of the stack, but is prevented from rotating when the rocker 188 swings toward the right. Accordingly, the roller 557 frictionally engages and pulls from the stack 10 the top sheet thereof to feed it to the tapes 55. The needle 551 will tear through the top sheet, but will bear against and hold the next successive sheet, thus insuring the feeding of one band at a time to the apparatus.

From the foregoing, it will be apparent that the present apparatus eliminates any step-by-step movement of the conveying means for the filler packs and bands, thus saving wear and tear on the parts resulting from the overcoming of inertia of such parts in stopping and starting their motion longitudinally of the apparatus. Moreover, the present apparatus eliminates the time lost in the stopping of the conveying means for the performance of the banding operation while the pack remains stationary. Accordingly, the apparatus operates continuously, the bands being fed automatically to the conveying means at the inlet end of the apparatus and moving continuously to the discharge end of the apparatus, the banding operation being performed while the band and pack move continuously. The apparatus accordingly provides for a high productive capacity.

It is to be understood that the forms of the invention illustrated and described are to be taken as preferred examples of the same, and that such changes may be resorted to as do not depart from the scope of the appended claims.

I claim:

1. A banding machine comprising a conveyor having an operative linear run, means continuously driving said conveyor, means for supplying bands to said conveyor run, means cooperating with said conveyor run for squaring the bands transversely of the line of said operative run, means adjacent said conveyor run for applying an adhesive to the lower face of each band adjacent one end thereof, said operative run of said conveyor being adapted to support on successive bands thereon articles to be banded, and folding means cooperating with said operative run of said conveyor at a point therealong after the placing of said articles upon the band and after the applying of said adhesive for folding the ends of said band around the articles as they move with said conveyor run, said folding means first engaging said one end of each band inwardly of the adhesive thereon and folding over such end of the band followed by the folding over of the other end of such band.

2. Apparatus for banding articles comprising a conveyor having an upper horizontal run movable in one direction and having an entering end and a discharge end, means connected to said conveyor for continuously driving it, means for successively feeding bands to said conveyor run adjacent the entering end of said run, band-engaging means carried by said run of said conveyor for pushing bands along and throughout the length of said run, said run of said conveyor having a loading station comprising means for positioning laterally of the apparatus successive articles placed on successive bands, means for moving such articles in said direction from said loading station at the speed of operation of said conveyor run, and folding means adjacent said conveyor run between said loading station and the discharge end of said run for folding the ends of successive bands over successive articles.

3. Apparatus constructed in accordance with claim 2 provided with means intermediate the entering end of said run of said conveyor and said folding means for applying an adhesive to the underside of one end of each band, said folding means operating to first engage said one end of the band wholly inwardly of the adhesive thereon and fold over said end of each successive band followed by the folding over of the other end thereof.

4. Apparatus constructed in accordance with claim 2 provided with positioning means on opposite sides of said run adjacent the entering end thereof and provided with transversely alined abutments engageable with the following edge of each successive band to position it transversely of the apparatus.

5. Apparatus constructed in accordance with claim 2 provided with means intermediate the entering end of said run of said conveyor and said folding means for applying an adhesive to the under side of one end of each band, said folding means operating to first engage said one end of said band inwardly of the adhesive thereon and fold over said end of each successive band followed by the folding over of the other end thereof, and means arranged above the path of travel of each article and engageable with said other end of each band to press it against the adhesive on said one end of such band.

6. A banding machine comprising a pair of conveyors each having an upper operative run provided with an entering end and a discharge end from the former to the latter of which said runs are movable, means connected to said conveyors for continuously driving them at the same speed, one conveyor having a plurality of plates certain of which are provided with band-engaging elements, means for supplying successive bands to said upper run of said one conveyor whereby following band-engaging elements will engage the following edge of each band to advance it with such conveyor run, article positioning elements comprising guides on opposite sides of said run of said one conveyor at a point spaced from said entering end, said guides being spaced apart a distance equal to a dimension of the article to be placed therebetween and being supported in slight spaced relation to the plates of said upper run of said one conveyor for the passage of the ends of the bands beneath said guides, means on the other conveyor engaging and moving articles therewith, means arranged outwardly of the path of the articles for applying an adhesive to the under side of one end of each successive band, folding means engageable with the ends of each successive band outwardly of the associated article for folding such band ends upwardly and over the associated article, said folding means engaging said one end of each band inwardly of the adhesive thereon prior to engagement with the other end of each band whereby said one end will be folded over the article prior to the folding of said other end whereby the latter will overlie the adhesive applied to said one end of the band, and means arranged above said run of said conveyor and engageable with said one end of each successive band for pressing it into engagement with the adhesive.

7. A banding machine comprising a conveyor having a plurality of plates and including a horizontal upper operative run having entering and discharge ends, means connected to said conveyor for continuously driving it, means for supplying successive bands to said plates from said entering end of said run, certain of said plates being provided with band-engaging devices spaced transversely of the line of movement of said conveyor run to engage following edges of bands fed to said conveyor run, a pair of chains spaced on opposite sides and adjacent the entering end of said conveyor run and provided at spaced points therealong with upstanding lugs arranged in pairs substantially alined with pairs of said band-engaging devices and engageable with following edges of the bands to position them transversely of the apparatus, the machine having a loading station comprising a pair of parallel guides to receive therebetween articles to be banded, means for effecting movement of the articles along said conveyor run, the ends of each band projecting transversely of the machine substantially beyond said guides, said guides being supported above the plane of the bands on said plates for the passage of the projecting ends of the bands thereunder, and means between said loading station and said discharge end of said conveyor run for folding the ends of each band up and over the top of an article moving with said run of said conveying means.

8. A banding machine comprising a conveyor having a plurality of plates and including a horizontal upper operative run having entering and discharge ends, means connected to said conveyor for continuously driving it, means for supplying successive bands to said plates from said entering end of said run, certain of said plates being provided with band-engaging devices spaced transversely of the line of movement of said conveyor run to engage following edges of bands fed to said conveyor run, a pair of chains spaced on opposite sides and adjacent the entering end of said conveyor run and provided at spaced points therealong with upstanding lugs arranged in pairs substantially alined with pairs of said band-engaging devices and engageable with following edges of the bands to position them transversely of the apparatus, the machine having a loading station comprising a pair of parallel guides to receive therebetween articles to be banded, the ends of each band projecting transversely of the machine substantially beyond said guides, said guides being supported above the plane of the bands on said plates for the passage of the projecting ends of the bands thereunder, a pair of article feeding chains on opposite sides of said conveyor run and spaced apart a distance less than the distance between said guides, said article feeding chains being provided with transversely alined pairs of article-engaging abutments for positively moving each article toward said discharge end of said conveyor run at the speed of movement of the latter, and means beween said loading station and said discharge end of said conveyor run for folding the ends of each band up and over the top of an article moving with said run of said conveying means.

9. Apparatus according to claim 8 provided with means between said entering end of said conveyor run and said folding means for applying a line of adhesive against the bottom surface of one end of each band, said folding means engaging said one end of each band inwardly of the adhesive thereon and folding such end over the article after which said folding means engages the other end of the band and folds it over said one end, and means engageable with said other end of each band between said folding means and said discharge end of said conveyor run for causing said other end of each band to adhere to the adhesive applied to said one end of the associated band.

10. Apparatus according to claim 8 provided with means for adjusting said band-engaging means and said lugs relative to said abutments longitudinally of said operative run to position each band centrally of the article placed thereon.

11. Apparatus constructed in accordance with claim 8 provided with a shaft connected to be driven by said conveyor driving means, a pair of sprockets surrounding said shaft and around which said article feeding chains pass, and means for adjusting said sprockets circumferentially of said shaft to adjust said abutments longitudinally of said upper run of said conveyor.

12. A banding machine comprising a conveyor having an upper operative run provided with an entering end and a discharge end, means connected to said conveyor for continuously driving it, means for supplying successive bands to said upper run adjacent the entering end thereof, pairs of engaging devices carried by said upper run and engageable against the following edge of successive bands to move them along said upper run, article positioning guides on opposite sides of said conveyor run at a point spaced from said entering end and between which articles to be banded are placed, means for moving such articles along said upper run at the speed of movement of the latter, the bands projecting transversely beyond the articles, and a pair of folding devices one at each side of the path of travel of the articles, each folding device comprising a hold-down bar having a flat face parallel to the adjacent face of the article and beneath and in flat contact with which a top edge portion of the article moves, and pick-up fingers projecting toward said entering end to lift the projecting ends of the bands, whereby, when the latter pass beneath said bars, the ends of each band will be folded over the top of an article.

13. Apparatus according to claim 12 provided with means between the entering end of said conveyor run and said hold-down bars for applying a line of adhesive across the under face of each band adjacent one end thereof, the folding device at the side of the article corresponding to said one end of each band engaging the latter inwardly of the adhesive thereon and being arranged in advance of the other folding device whereby said one end of each band will be folded over the top of an article ahead of said other end of each band whereby the latter end of the band will lie across the adhesive.

14. Apparatus according to claim 12 wherein said article moving means comprises chains lying at opposite sides of and parallel to said conveyor and inwardly of said guides, said chains having upstanding abutments arranged in pairs each engageable with the following edge of an article independently of said band-engaging devices to advance it along said conveyor run, and means for moving said chains at the speed of movement of said conveyor run.

15. Apparatus according to claim 12 wherein said article moving means comprises chains lying at opposite sides of and parallel to said conveyor and inwardly of said guides, said chains having upstanding abutments arranged in pairs each engageable with the following edge of an article independently of said band-engaging devices to advance it along said conveyor run, a shaft driven by said conveyor driving means, a pair of sprockets mounted on said shaft and around which said chains pass, and means for circumferentially adjusting said sprockets around said shaft to arrange each pair of abutments in predetermined relationship to an associated pair of said pins.

16. Apparatus according to claim 12 wherein said article moving means comprises chains lying at opposite sides of and parallel to said conveyor and inwardly of said guides, said chains having upstanding abutments arranged in pairs each engageable with the following edge of an article independently of said band-engaging devices to advance it along said conveyor run, a pair of relatively short conveyors spaced on opposite sides of said chains and within the limits of the length of a band projecting transversely of the apparatus, said short conveyors having upper runs and being provided with alined pairs of lugs engageable with the following edges of successive bands to aline the latter transversely of the apparatus.

17. A banding machine comprising a conveyor having an upper horizontal linear run, means continuously driving said conveyor to move said run in one direction from an entering end to a discharge end, means for supplying successive bands to the entering end of said conveyor run, means carried by said conveyor and engageable with successive bands to move them along said run, guides spaced from the entering end of said run for positioning successive articles placed on bands on said conveyor run, folding means adjacent said conveyor run between said guides and the discharge end of said run, and means between the entering end of said run and said folding means for applying a line of adhesive to one end of each successive band beneath one end thereof, said folding means comprising a folding device at each side of said conveyor run each engageable with one end of a band for folding it upwardly and over the article, the folding device for said one end of each band engaging the latter wholly inwardly of the line of adhesive thereon, the folding device for the other end of each band having an element engageable with the band for supporting said other end of each band above the article until said one end of each band has been folded thereover.

18. Apparatus according to claim 17 wherein said element comprises a spring wire extending parallel to and above said conveyor run toward the side thereof adjacent the folding device for said other end of each band, said wire lying inwardly of said other end of each band.

References Cited in the file of this patent

UNITED STATES PATENTS

| | | |
|---|---|---|
| 1,968,172 | Renz | July 31, 1934 |
| 2,018,432 | Ackley | Oct. 22, 1935 |
| 2,651,899 | Ackley | Sept. 15, 1953 |